US010676163B2

(12) United States Patent
Robbins et al.

(10) Patent No.: US 10,676,163 B2
(45) Date of Patent: Jun. 9, 2020

(54) MOLDED-IN BOAT GRIP

(71) Applicant: Lifetime Products, Inc., Clearfield, UT (US)

(72) Inventors: Samuel S. Robbins, South Ogden, UT (US); Dennis Jay Norman, Syracuse, UT (US)

(73) Assignee: Lifetime Products, Inc., Clearfield, UT (US)

( * ) Notice: Subject to any disclaimer, the term of this patent is extended or adjusted under 35 U.S.C. 154(b) by 141 days.

(21) Appl. No.: 15/676,781

(22) Filed: Aug. 14, 2017

(65) Prior Publication Data

US 2018/0057124 A1   Mar. 1, 2018

Related U.S. Application Data

(60) Provisional application No. 62/380,179, filed on Aug. 26, 2016.

(51) Int. Cl.
*B29C 49/54* (2006.01)
*B63B 32/70* (2020.01)
*B63B 32/57* (2020.01)
*B29L 31/52* (2006.01)
*B63B 34/20* (2020.01)
*B63B 34/26* (2020.01)

(52) U.S. Cl.
CPC .............. *B63B 32/70* (2020.02); *B29C 49/54* (2013.01); *B63B 32/57* (2020.02); *B29L 2031/52* (2013.01); *B63B 34/20* (2020.02); *B63B 34/26* (2020.02)

(58) Field of Classification Search
CPC ........ B29C 49/54; B29C 33/485; B29C 51/34
See application file for complete search history.

(56) References Cited

U.S. PATENT DOCUMENTS

| 4,090,756 | A | 5/1978 | Frey et al. |
| 4,699,076 | A | 10/1987 | Curtis et al. |
| 5,397,525 | A | 3/1995 | Niemier |
| 6,073,574 | A | 6/2000 | King et al. |
| 6,349,662 | B1 | 2/2002 | Limansky et al. |
| 6,401,648 | B1 | 6/2002 | Abbenhouse |

(Continued)

FOREIGN PATENT DOCUMENTS

| CN | 102292206 A | 12/2011 |
| CN | 103552656 | 2/2014 |

(Continued)

OTHER PUBLICATIONS

U.S. Appl. No. 14/558,090, filed Dec. 2, 2014, Edward Van-Nimwegen.

(Continued)

*Primary Examiner* — Robert B Davis
(74) *Attorney, Agent, or Firm* — Workman Nydegger

(57) ABSTRACT

In one example, a watercraft includes a hull in the form of a unitary, single-piece structure that is substantially hollow, and made of plastic. A grip is provided that is integral with the hull and includes a recess that is formed in a skin of the hull and is integral with the hull, and the grip also includes an undercut that is formed in the skin of the hull proximate an edge of the recess. The undercut is integral with the hull and communicates with the recess.

20 Claims, 23 Drawing Sheets

(56) References Cited

U.S. PATENT DOCUMENTS

| | | |
|---|---|---|
| 6,932,011 B2 | 8/2005 | Nagata et al. |
| 6,990,920 B2 | 1/2006 | Hamilton et al. |
| 7,032,531 B1 | 4/2006 | Caples |
| 7,320,291 B2 | 1/2008 | Eckert |
| 7,735,442 B2 | 6/2010 | Richter |
| 8,082,869 B2 | 12/2011 | Beaty |
| 8,616,142 B2 | 12/2013 | Eckert et al. |
| 8,777,683 B2 | 7/2014 | Friedman |
| 8,800,468 B2 | 8/2014 | VanNimwegen et al. |
| 9,120,218 B1 | 9/2015 | Stehlik |
| 9,676,458 B2 | 6/2017 | VanNimwegen |
| 2007/0098935 A1* | 5/2007 | Farran ............... B29C 33/48 428/35.7 |
| 2007/0290413 A1* | 12/2007 | Tonga ............... B29C 49/54 264/523 |
| 2008/0105189 A1 | 5/2008 | Richter |
| 2012/0122357 A1 | 5/2012 | Eckert et al. |
| 2013/0017743 A1 | 1/2013 | Green et al. |
| 2013/0048821 A1 | 2/2013 | Leet et al. |
| 2013/0074760 A1 | 3/2013 | VanNimwegen et al. |
| 2013/0130578 A1 | 5/2013 | Friedman |
| 2016/0152306 A1 | 6/2016 | VanNimwegen |

FOREIGN PATENT DOCUMENTS

| | | |
|---|---|---|
| DE | 20311223 | 11/2014 |
| GB | 2527745 A | 1/2016 |
| JP | S 55/152034 | 11/1980 |
| JP | S5814298 B2 | 3/1983 |
| JP | H01176537 A | 7/1989 |
| JP | H6263150 | 9/1994 |
| WO | WO2010/086370 A1 | 1/2010 |
| WO | WO2016/089458 A1 | 8/2015 |

OTHER PUBLICATIONS

U.S. Appl. No. 62/380,179, filed Aug. 26, 2016, Robbins, et al.
Frontenac Outfitters Canoe and Kayak Centre, Kayak Parts and Terminology, frontenac-outfitters.com, http://frontenac-outfitters.com/kayaks-2/kayak-parts-terminology, Ontario, accessed on Aug. 2014.
Douglas Wiilcox, Malin Gometra sea kayak long term test and comparative review, Oct. 14, 2013, playak.com, http://playak.com/news.php?idd=2666561627522, accessed on Aug. 2014.
Jupiter Kite / Paddle / Wake, Lift SUP Retractable Paddleboard Handle, www.jupiterkiteboarding.com, http://www.jupiterkiteboarding.com/store/lift-retractable-paddleboard-handle-p-3068.html, accessed on Aug. 2014.
Kayarchy, Sea kayaks vs. other kayaks and canoes, www.kayarchy.co.uk, http://www.kayarchy.co.uk/html/01equipment/010otherkayaks.htm, accessed on Aug. 2014.
Sherri Mertz, Everything You Need to Know About End Toggles, but Never Knew to ask (Part I), Apr. 16, 2012, www.sherrikayaks.com, http://www.sherrikayaks.com/2012/04/16/everything-you-need-to-know-about-end-toggles-but-never-knew-to-ask-part-i/, accessed on Aug. 2014.
Vincent S. Rinando Jr., Product Review: Necky Vector 13, Jan. 4, 2011, www.austinkayak.com, http://www.austinkayak.com/blog/2011/01/product-review-necky-vector-13/, accessed on Aug. 2014.
Teksport, Kayak Handle (Stainless Steel-Plastic Style), www.teksport.co.uk, http://www.teksport.co.uk/Kayak+Handle+(stainless+steel+plastic+style/0_CAAA002/PRAA003.htm, accessed on Aug. 2014.
International Search Report and Written Opinion of PCT/US2015/046577, dated Nov. 30, 2015, filed Aug. 24, 2015.
U.S. Appl. No. 14/558,090, filed Dec. 21, 2015, Office Action.
U.S. Appl. No. 14/558,090, filed Apr. 27, 2016, Final Office Action.
U.S. Appl. No. 14/558,090, filed Aug. 15, 2016, Office Action.
U.S. Appl. No. 14/558,090, filed Nov. 17, 2016, Office Action.
U.S. Appl. No. 14/558,090, filed Mar. 8, 2017, Notice of Allowance.
Canadian Office Action CA Application No. 2,976,821, dated Sep. 5, 2018.
Chinese Office Action and Search Report CN Application No. 2017107445298, dated Nov. 28, 2018.
Canadian Office Action CA Application No. 2,976,821, dated Jun. 11, 2019.
Chinese Office Action CN Application No. 2017107445298, dated Jul. 12, 2019.
Office Action issued in Chinese Application No. 201710744529.8 dated Dec. 31, 2019—translation received Apr. 30, 2020.

\* cited by examiner

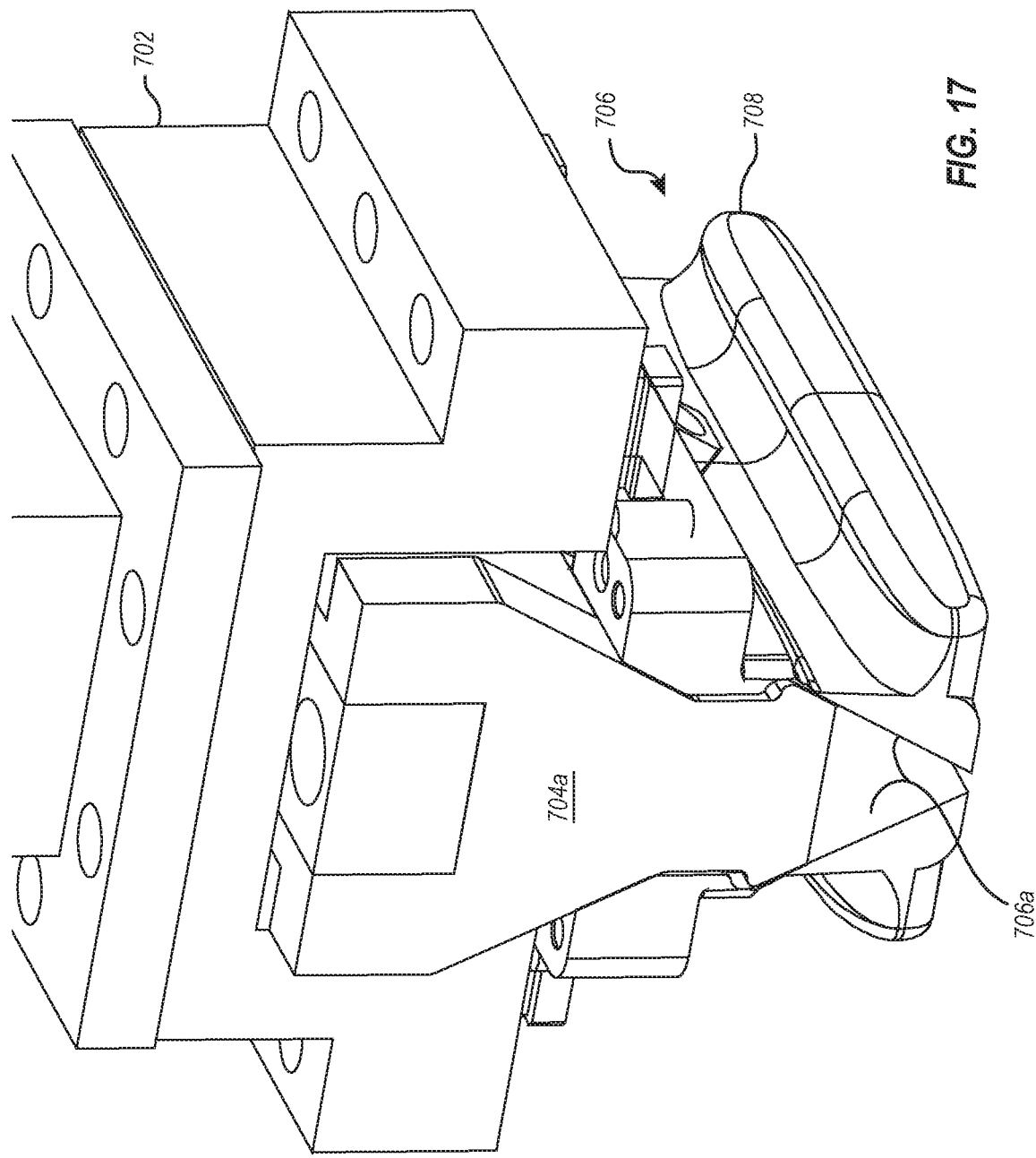

MOLDED-IN BOAT GRIP

RELATED APPLICATIONS

This application hereby claims priority to U.S. Provisional Patent Application Ser. 62/380,179, entitled MOLDED-IN BOAT GRIP, and filed Aug. 26, 2016. The aforementioned application is incorporated herein in its entirety by this reference.

FIELD OF THE INVENTION

The present invention generally relates to molded structures, examples of which include blow molded watercraft such as kayaks and other types of boats. One or more aspects of example embodiments may also find application in watercraft suitable for use in water sports or other activities such as, but not limited to, sailboats, paddleboards, surfboards, paipo boards, wave skimmers, boards for wind surfers, kneeboards, wakeboards, and bodyboards, examples of which include boards referred to as boogie boards. More generally, embodiments of the invention can be employed in connection with any molded structure, including blow molded structures, where an undercut is desired.

BACKGROUND

The size and/or shape of some types of watercraft can make them awkward to grip and transport when they are not in use. Accordingly, such watercraft can be equipped with some type of grip or handhold to better facilitate handling and transportation. Depending upon the nature of the construction of the watercraft however, the manufacturing of such grips or handholds can be problematic.

For example, some types of watercraft, such as paddleboards and kayaks, have a blow molded construction. The blow molded construction may be desirable because it produces a light and strong structure. However, some blow-molding processes are unable to create an undercut configuration that a user can readily grasp and hold. Instead, the blow-molding process may only form a recess or indentation that lacks an undercut for a user to grip.

Thus, while a blow-molding process can form a grip that a user can grasp in an attempt to grip and transport the watercraft, that grip is not particularly effective. Moreover, the effectiveness of the grip is likely to be reduced further when the watercraft is wet since the grip can tend to slip out of the hand of the user. This undesirable result is particularly likely where the watercraft is large and/or has an unwieldy shape.

Accordingly, what is needed is a grip that includes an undercut structure that can enable a user to readily grasp and hold the watercraft, or other structure, where the grip is employed. The grip may be particularly useful when employed in connection with blow-molded or other structures where formation of an undercut is difficult, or impossible. It would also be useful to provide molding systems and mechanisms that can form an undercut structure. Finally, it would be useful to be able to create undercut structures in connection with a blow-molding process, and/or other molding processes.

BRIEF SUMMARY OF ASPECTS OF SOME EXAMPLE EMBODIMENTS

Example disclosed embodiments are concerned with various types of watercraft, such as, but not limited to, boats such as kayaks and sailboats for example, surfboards, paipo boards, boards for wind surfers, kneeboards, wave skimmers, wakeboards, and bodyboards, examples of which include boards referred to as boogie boards. Other embodiments are directed more generally to any molded structure, including blow molded plastic structures for example, that may benefit from the inclusion of one or more undercuts such as are disclosed herein. Some examples of such blow-molded structures may include, but are not limited to, panels, chairs, boxes, outdoor furniture, play sets and playground equipment, and tables.

The embodiments disclosed herein do not constitute an exhaustive summary of all possible embodiments, nor does this summary constitute an exhaustive list of all aspects of any particular embodiment(s). Rather, this summary simply presents selected aspects of some example embodiments. It should be noted that nothing herein should be construed as constituting an essential or indispensable element of any invention or embodiment. Rather, and as the person of ordinary skill in the art will readily appreciate, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular effect(s).

In particular, example embodiments within the scope of this disclosure may include one or more of the following elements, in any combination: a molded element having a unitary-one piece structure that is substantially hollow; a molded plastic element having a unitary-one piece structure that is substantially hollow; a blow-molded element having a unitary-one piece structure that is substantially hollow; a watercraft including a portion that is blow-molded, where the blow-molded portion is in the form of a unitary, one-piece structure that is substantially hollow; a blow-molded watercraft hull in the form of a unitary, one-piece structure that is substantially hollow; a blow-molded element having a unitary-one piece structure that includes one or more integral undercuts; a blow-molded boat, or other watercraft, having a unitary-one piece structure that includes one or more integral undercuts; a moving core device; a moving core device having a modifiable configuration; a moving core device configured to create one or more integral undercuts in a blow-molded structure; a moving core device configured to create two mirror image integral undercuts in a blow-molded structure; a moving core device configured to create two mirror image integral undercuts in a blow-molded structure; a moving core device configured to create one or more integral undercuts during a blow-molding process; a reusable moving core device; and, a method for creating one or more integral undercuts in a blow-molded structure.

Any embodiment of a watercraft, or other structure, that is constructed at least partly of blow-molded plastic may have an interior that is partly, or completely, hollow. Such embodiments may also include, disposed in the interior, one or more depressions, sometimes referred to as "tack-offs." In such embodiments, these tack-offs may be integrally formed as part of a unitary, one-piece structure during the blow-molding process. The depressions may extend from a first surface, such as a first interior surface of a hull for example, towards a second surface, such as a second interior surface of the hull for example. The ends of one or more depressions may contact or engage the second surface, or the ends of one or more of the depressions may be spaced apart from the second surface by a distance. In some instances, one or more depressions on a first interior surface may be substantially aligned with corresponding depressions on a second interior surface, and one or more depressions on the first interior surface may contact one or more corresponding depressions on the second interior surface or, alternatively, one or more depressions on the first interior surface may be spaced apart from corresponding depressions on the second interior surface. In still other instances, depressions that contact each other and depressions that are spaced apart from each other may both be present in a watercraft. The depressions may be sized and configured to strengthen and/or reinforce a blow-molded plastic hull of the watercraft. Following is a brief listing of some example embodiments. Finally, and more generally, such tack-offs can be included in any other blow-molded structure.

In a first example embodiment, a blow-molded element has a unitary one-piece structure that includes one or more undercut portions.

In a second example embodiment, a blow-molded element has a unitary one-piece structure that includes an integral grip configured with an undercut portion.

In a third example embodiment, a blow-molded element that is substantially hollow has a unitary one-piece structure that includes an integral grip configured with an undercut portion.

In a fourth example embodiment, the blow-molded element of any of the first, second and third embodiments takes the form of a boat, such as a kayak for example, or a paddleboard.

In a fifth example embodiment, a moving core device has a modifiable configuration.

In a sixth example embodiment, a moving core device is configured to create an integral undercut in a blow-molded structure.

In a seventh example embodiment, a moving core device is configured to create an integral undercut in a plastic element during a blow-molding process.

In an eighth example embodiment, a moving core device is provided that is reusable for multiple molding processes.

In a ninth example embodiment, a method is provided for creating an integral undercut as part of a hollow plastic structure during a molding process.

In a tenth example embodiment, a method is provided for creating an integral undercut in a blow-molded structure.

In an eleventh example embodiment, a method is provided for creating an integral undercut in a blow-molded structure during a blow molding process.

In a twelfth example embodiment, a method is provided for creating a grip in the form of an integral undercut in a blow-molded watercraft during a blow molding process.

In alternative embodiments, any of the aforementioned embodiments, as well as the other embodiments disclosed herein, can be produced using a molding process other than blow molding, such as, for example, roto-molding, thermoforming, vacuum molding, twin sheet molding, and drape molding.

With particular regard to thermoforming, one example of such a process involves thermoforming two separate parts of a molded structure, such as a watercraft for example, and then attaching the two parts to each other by a suitable process. One or more undercuts can be formed in one or both of the separate parts so that the final structure having the two parts joined together may include one or more undercuts. Thus, a structure such as a watercraft can comprise multiple unitary, single-piece structures that are attached to each other or, alternatively, a watercraft may consist of only one unitary, single-piece structure.

As well, any disclosed embodiment can include multiple integral undercuts, two or more of which may be mirror images of each other, or may differ from each other in terms of any one or more of their size, configuration, orientation, and location.

BRIEF DESCRIPTION OF THE DRAWINGS

The appended drawings contain figures of example embodiments to further illustrate and clarify the above and other aspects, advantages and features of the present invention. It will be appreciated that these drawings depict only example embodiments of the invention and are not intended to limit its scope. The invention will be described and explained with additional specificity and detail through the use of the accompanying drawings in which:

FIGS. 16 and 17 disclose aspects of the configuration and operation of another example moving core device.

DETAILED DESCRIPTION OF EXAMPLE EMBODIMENTS

Figure 1:
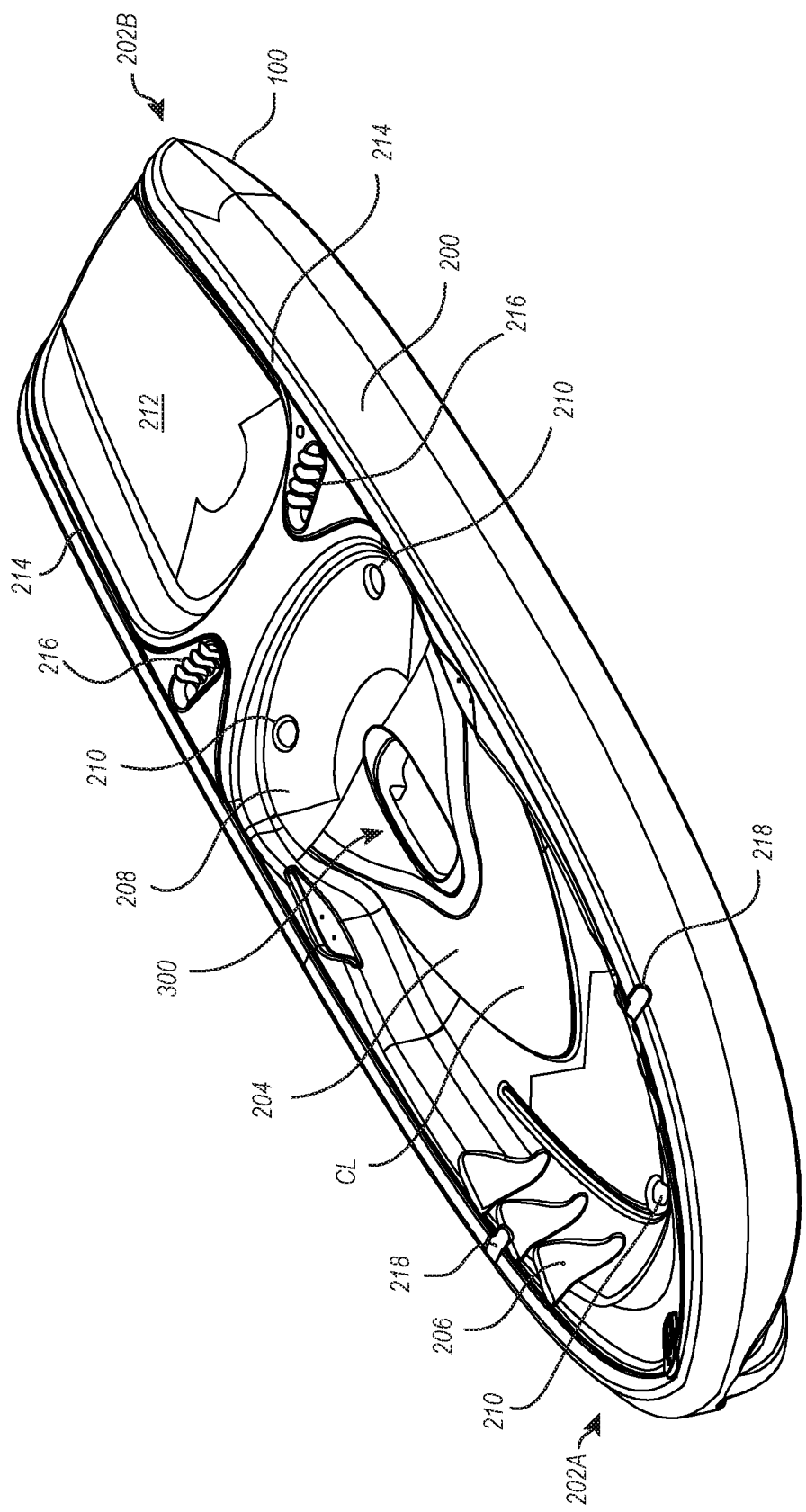
FIG. 1 is a top perspective view of an example kayak with a grip that includes one or more undercuts.
Figure 2:
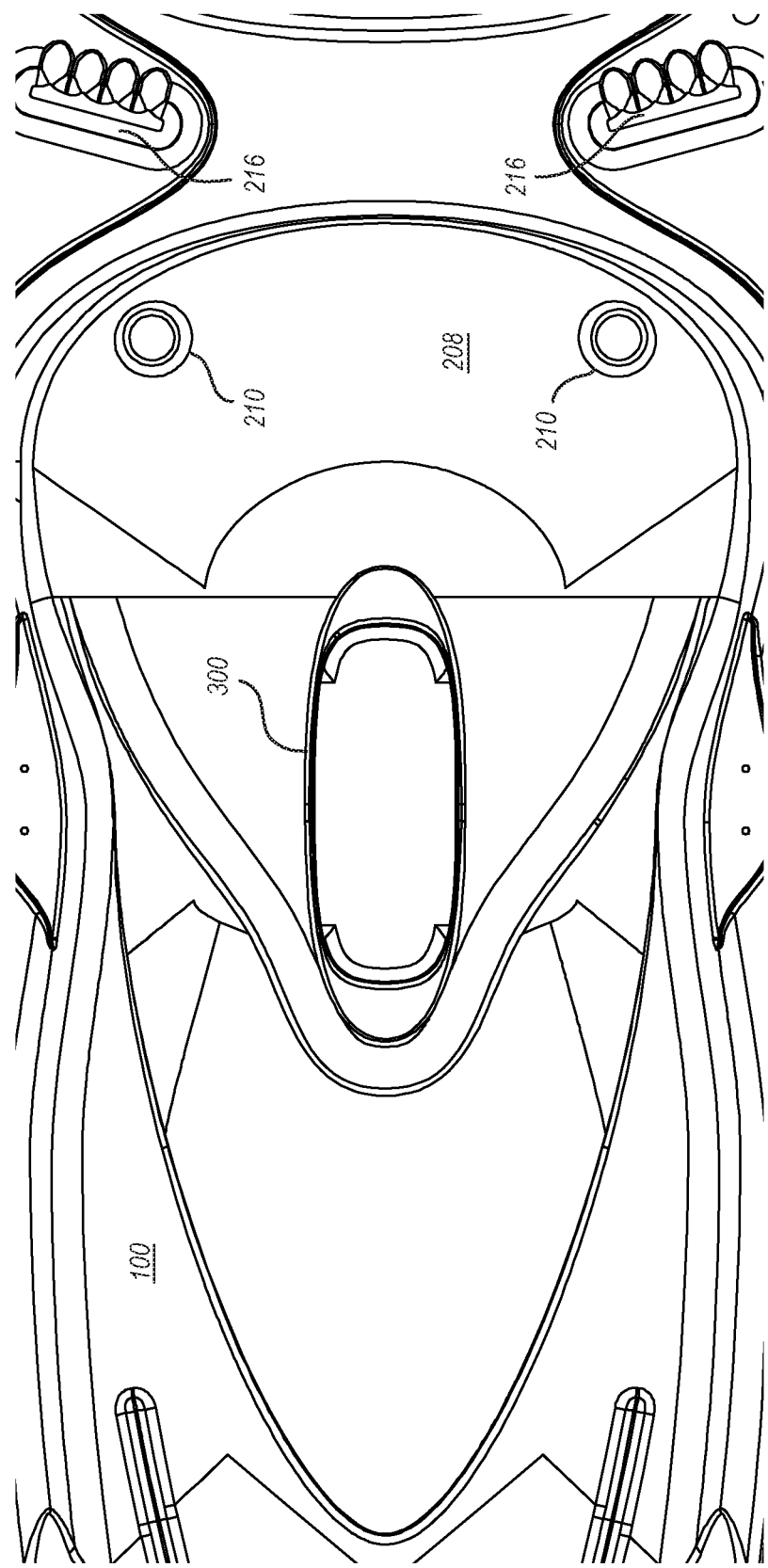
FIG. 2 is a close up top view of the grip of FIG. 1.
Figure 3:
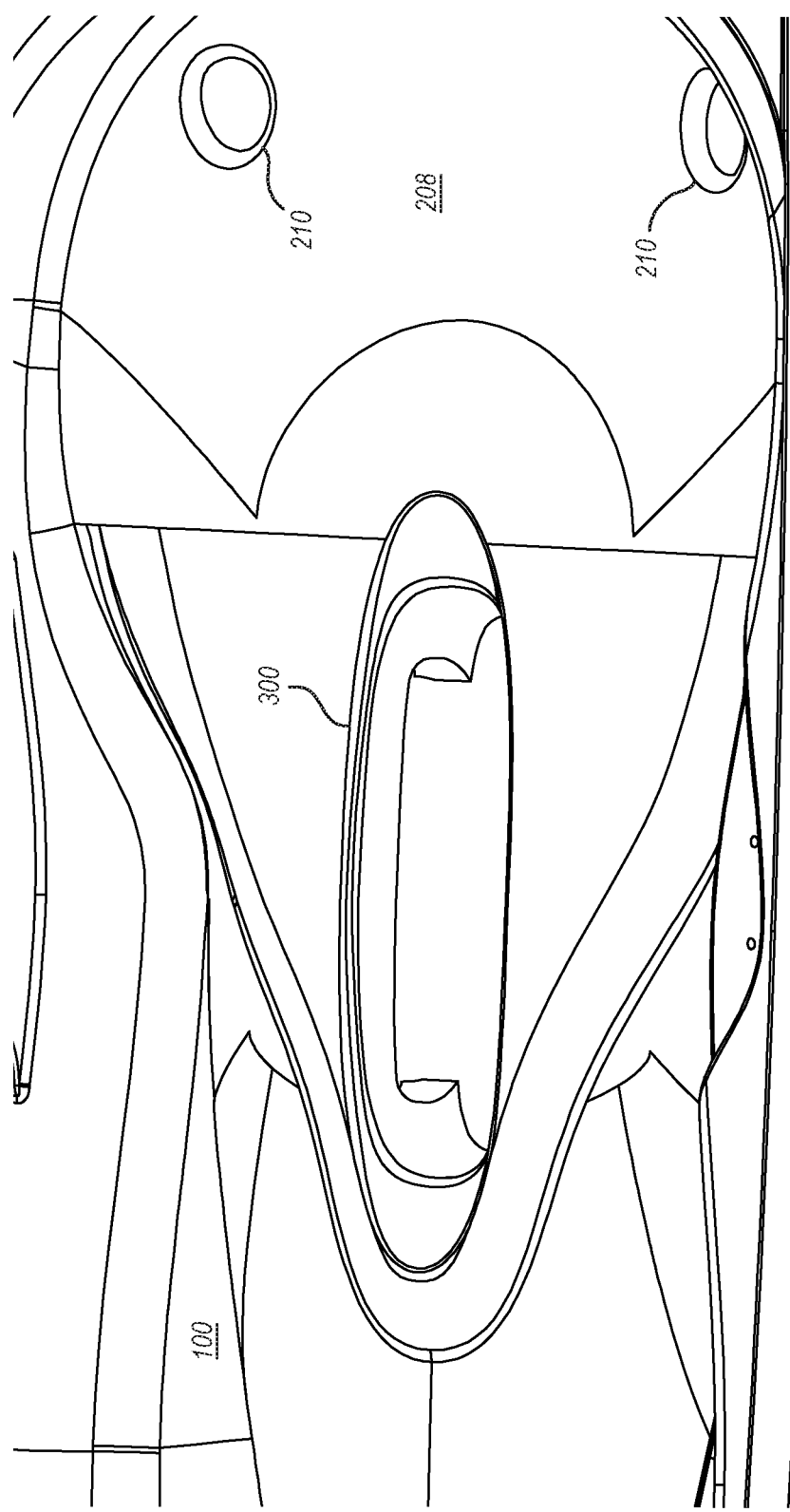
FIG. 3 is a side perspective view of an example kayak including a grip.
Figure 4:
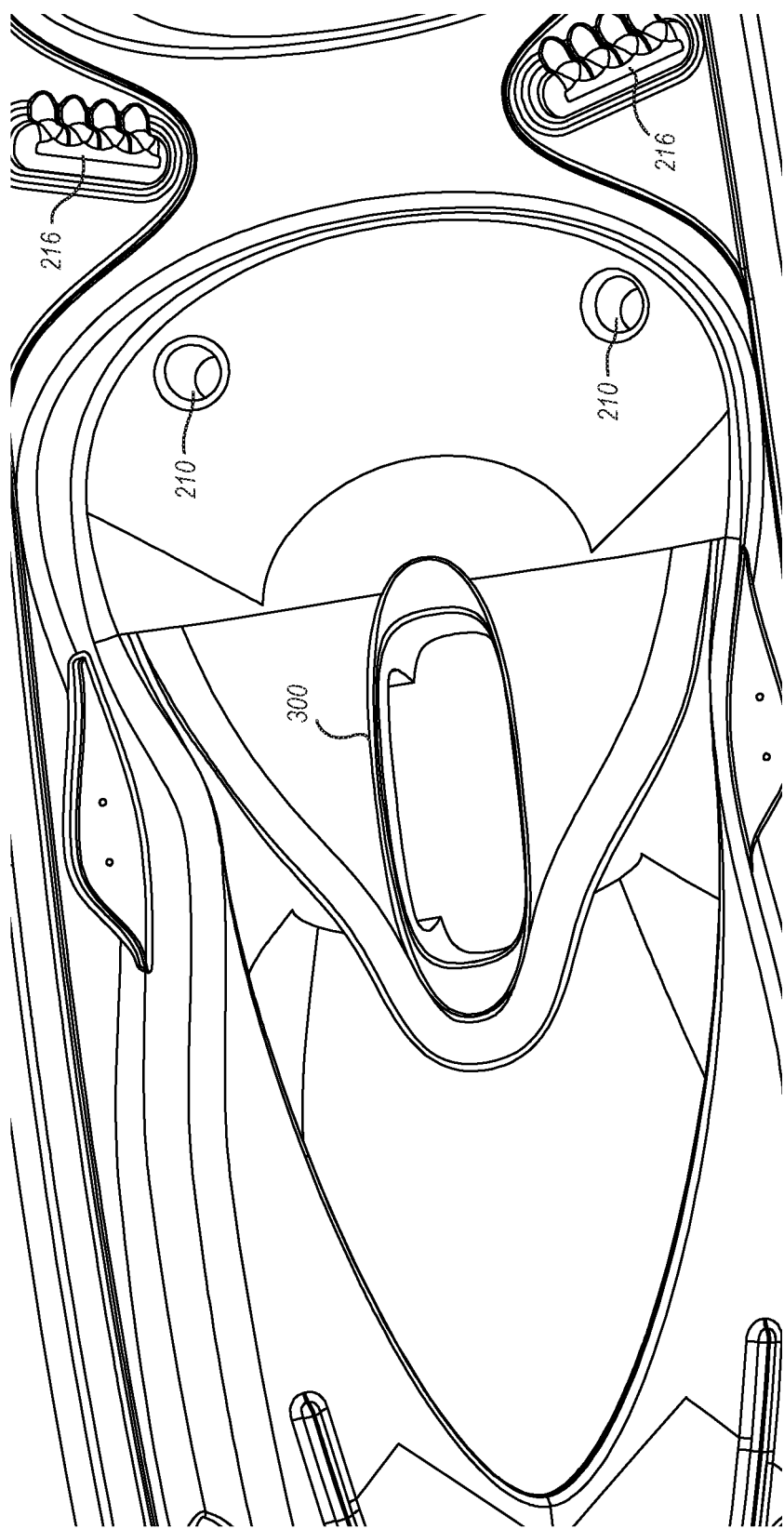
FIG. 4 is another side perspective view of an example kayak including a grip.
Figure 5:
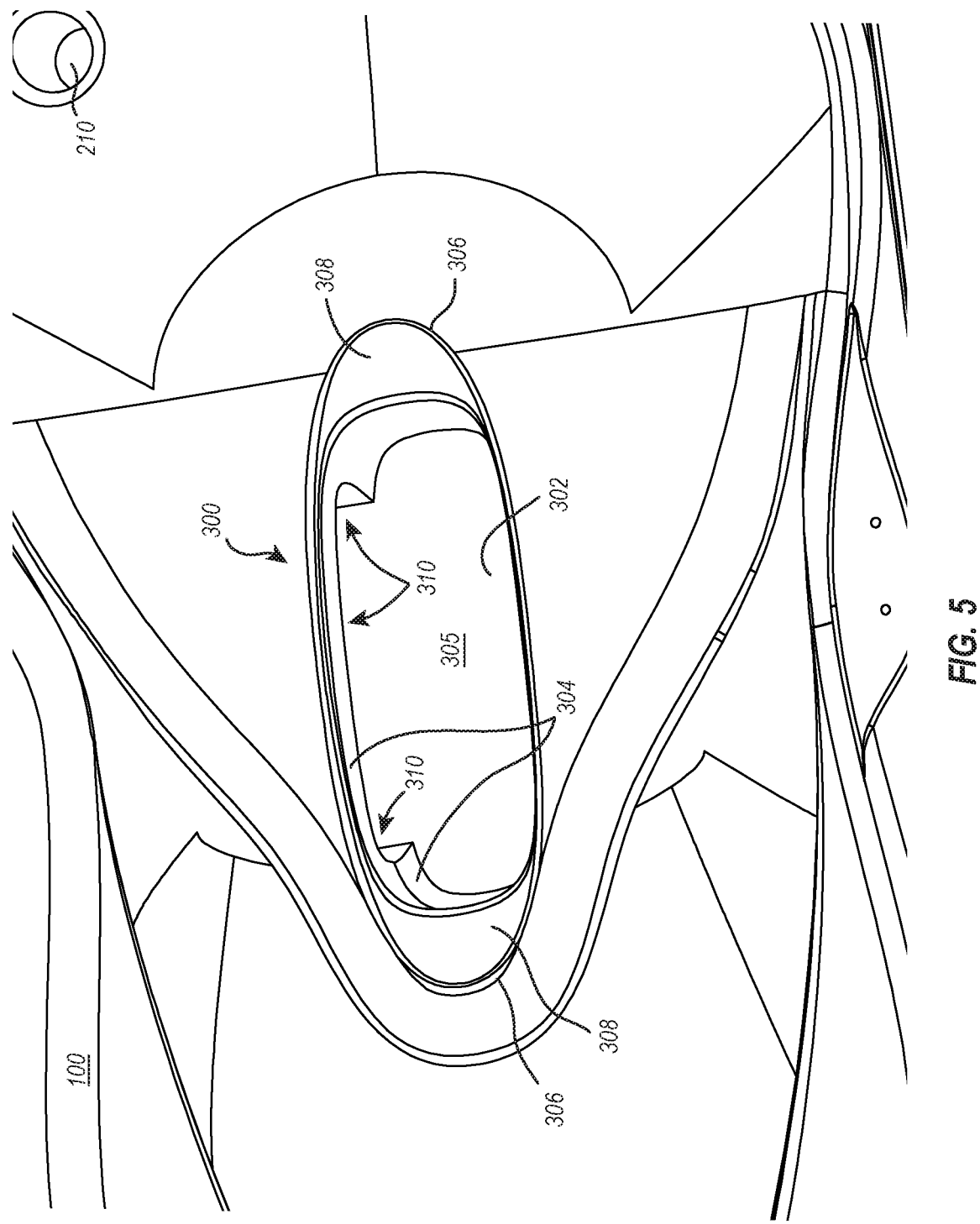
FIG. 5 is a top perspective view of an example grip.
Figure 6:
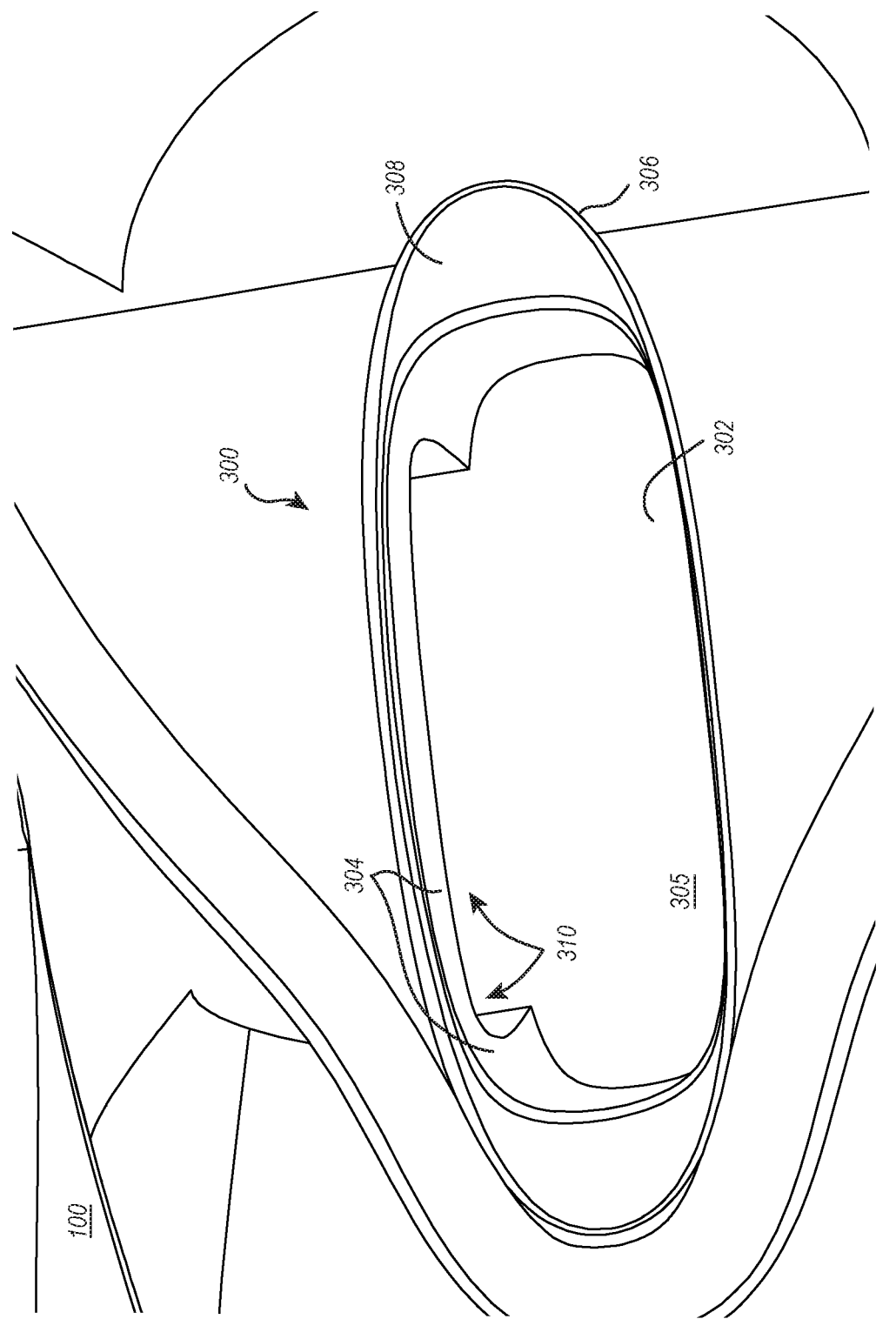
FIG. 6 is a top perspective view of an example grip with an undercut.

Some embodiments of the present invention generally relate to watercraft, examples of which include kayaks and other types of boats. Thus, in some particular examples, one or more embodiments take the form of a sit-on-top kayak or watercraft, and yet other embodiments take the form of a sit-inside kayak or watercraft. One or more aspects of example embodiments may also find application in watercraft suitable for use in water sports or other activities such as, but not limited to, sailboats, paddleboards, surfboards, paipo boards, wave skimmers, boards for wind surfers, kneeboards, wakeboards, and body boards, examples of which include boards referred to as boogie boards.

More generally, the scope of the invention is not limited to watercraft and, rather, extends more generally to embrace any molded element in which one or more undercut portions might prove useful. Such other molded structures include, but are not limited to, panels, chairs, boxes, outdoor furniture, play sets and playground equipment, and tables and/or any other structures where one or more undercuts within the scope of this disclosure may be useful. These molded structures can be made using any of a variety of production processes including, for example, roto-molding, thermoforming, vacuum molding, twin sheet molding, and drape molding.

Undercuts within the scope of the invention can be created and employed for a wide variety of purposes and are not limited to use in connection with a grip or handle. Thus, while some embodiments include an undercut, or undercut portion, that is an element of a grip, use of one or more undercuts as elements of a grip is not required. As such, yet other embodiments within the scope of the invention may include a grip, as well as an undercut that is not an element of the grip, while still other embodiments within the scope of the invention may include one or more undercuts and omit a grip altogether. Accordingly, while a grip may include one or more undercuts, there is no requirement that an undercut be employed in connection with a grip.

In one particular example embodiment, a watercraft is provided that includes a unitary, single-piece structure, such as can be created using a blow-molding process, or other molding process. The watercraft is hollow plastic and includes one or more integral grips that enable a user to pick up the watercraft. Advantageously, the grip can include one or more undercut portions that may enhance the ability of the user to grip, hold, and carry the watercraft.

A. Aspects of Various Example Watercraft

With particular reference first to FIGS. 1-4, an example watercraft 100 is disclosed that includes a hull 200. In the example of FIGS. 1-4, the watercraft 100 takes the form of a sit-on-top kayak, although the scope of the invention is not limited to that particular watercraft and, as noted herein, another example embodiment of the invention takes the form of a paddleboard, while still other example embodiments are directed to structures other than watercraft. Some or all of the hull 200 may be constructed of plastic that is blow-molded so that the hull defines an interior that is partially or completely hollow. However, other processes, such as roto-molding, thermoforming, vacuum molding, twin sheet molding, and drape molding, for example, may be employed in the construction of any of the embodiments disclosed herein, and the scope of this disclosure is not limited to any particular manufacturing process(es).

The hull 200 may be any size and/or shape desired, and the Figures provided herewith simply disclose some illustrative, but non-limiting, configurations. In the example of FIGS. 1-4, the hull 200 is a single piece of blow-molded plastic that includes a bow 202a and a stern 202b. The hull 200 may include, among other things, a cockpit 204, and one or more foot wells 206 on either side of the cockpit 204. In general, the foot wells 206 may be configured and arranged to provide support for the feet of a user. In some embodiments, the foot wells 206 may be integrally formed with the hull 200. Aspects such as the size, geometry, orientation, number, location and spacing of the foot wells 206 can be selected as desired. Among other things, the foot wells 206 may enable a user to position his or her feet in a variety of different locations within the cockpit 204. This flexibility in positioning may prove useful where considerations such as physical size and paddling style can vary from one user to another. As well, different water, wind and other environmental conditions may dictate changes in the foot position of a user.

Embodiments of the watercraft 100 may also have one, two, or more, seats 208. In the particular example of FIGS. 1-4, one seat 208 is provided, although more seats may be provided in other embodiments. In some embodiments, the seat 208 may be integrally formed with the hull 200. One or more of the seats 208 may be sized and oriented to accommodate an adult passenger.

Some embodiments of the watercraft 100 may include one or more scuppers 210 which serve to drain the seat 208 area and/or other portions of the cockpit 204. Particularly, the scuppers 210 can each be formed as a tack-off as shown in FIGS. 7, 9, 10 and 13 for example, and may enable collection and removal of water that enters the watercraft 100. As well, the watercraft 100 can include a swim up ramp 212 bounded on either side by a side rail 214. One or more finger holds 216 can be provided that enable a user to pull himself up onto the swim up ramp 212. A pair of paddle rests 218 is also provided that is configured to accommodate the shaft of a paddle (not shown).

Finally, the watercraft 100 can include one or more grips 300. In the illustrated example, only a single grip 300 is provided and is centered on or near the centerline CL of the watercraft. Longitudinally, the grip 300 may be located approximately midway between the bow 202a and the stern 202b. As the foregoing statements suggest, the grip 300 can be located proximate an X-Y-Z center of gravity of the watercraft 100. Thus located, the grip 300 can be readily accessed by a user and enables a user to grip and retain the watercraft 100, for example, when the user is carrying the watercraft 100 under his arm. The configuration and arrangement in FIGS. 1-4 is presented only by way of example however. In other embodiments, more than one grip 300 may be provided in a structure, such as a watercraft for example, and the grip(s) 300 can be located anywhere on, or in, the watercraft 100.

Thus, in at least some embodiments, one or more grips 300 may be located inside the hull 200 and/or on the outside of the hull 200, near a fore and aft center of gravity ("CG") so that a user employing the grip 300 can readily find a point of balance, in the fore and aft direction, and thus avoid the problem of dragging either the bow 202a or stern 202b when the user is carrying the watercraft 100. It can be difficult in some circumstances to precisely determine the point of balance during manufacturing, however, so the grip 300 may be located such that respective opposite ends of the grip 300 are located on either side, that is, fore and aft, of the fore and aft CG. As a result of this configuration, a user can simply move his hand longitudinally within the grip 300 until the point of balance is found.

B. Aspects of Some Example Grip Configurations

With reference next to FIGS. 5-13, further details are provided concerning the example grip 300. In general, the grip 300, or grips 300, is/are configured and located to enable a user to readily grasp and hold the watercraft 100. Thus, the grips 300 may be particularly useful where the watercraft 100 is relatively large and/or has an unwieldy shape.

More particularly, at least some embodiments of the grip 300 include an undercut structure that can enable a user to readily grasp and hold the watercraft, or other structure, where the grip is employed. Note that as used herein, an "undercut" refers to a configuration in which material is absent from the underside of an object, so as to leave an overhanging portion in relief. As is thus apparent from the foregoing, the term undercut herein is intended to be broadly construed and does not necessarily require that any material actually be cut away or otherwise physically removed but rather simply describes a physical configuration, without regard to how that physical configuration is achieved.

As indicated in FIGS. 5, 6, 8 and 9, for example, the grip 300 can include a recess 302 bounded by a wall 304. The wall 304 thus defines the length and width of the recess 302, while the floor 305 cooperates with the wall 304 to define the depth of the recess 302. The recess 302 and wall 304 can have any size or shape. In the illustrated example, the recess 302 can include shallow flared portions 306 at either end that are defined by respective sloping portions 308 that intersect the wall 304. Where the example recess 302 has a generally elongate form, as further indicated in FIGS. 5-13, the longer dimension of the recess 302 can be oriented generally in a fore and aft direction, although that is not required. In some embodiments, the recess 302 has a substantially uniform depth throughout, although in other embodiments, the depth can vary across the width and/or length of the recess 302, as in the case of the example of FIGS. 5 and 6.

It should be understood that the configuration disclosed in FIGS. 5-13 is presented solely by way of example however, and the scope of the invention is not limited to any particular size, shape or arrangement of a recess. In general, some embodiments of the recess can be sized and configured to accommodate part, or all, of the hand of a user.

As further indicated in FIGS. 5-13, the interior of the recess 302 communicates with an undercut 310. Thus, a user desiring to grasp the watercraft 100 can place portions of one or more fingers, for example, into the undercut 310, thus achieving a firm grip and hold on the watercraft 100. As such, the height, width, and depth (see FIG. 7) of the example undercut 310 can be such as to accommodate part, or all, of one or more fingers of a user. As well, one, some, or all, of the height, width and depth of the undercut 310 can vary from one location in the undercut to another location in the undercut 310.

Figure 7:
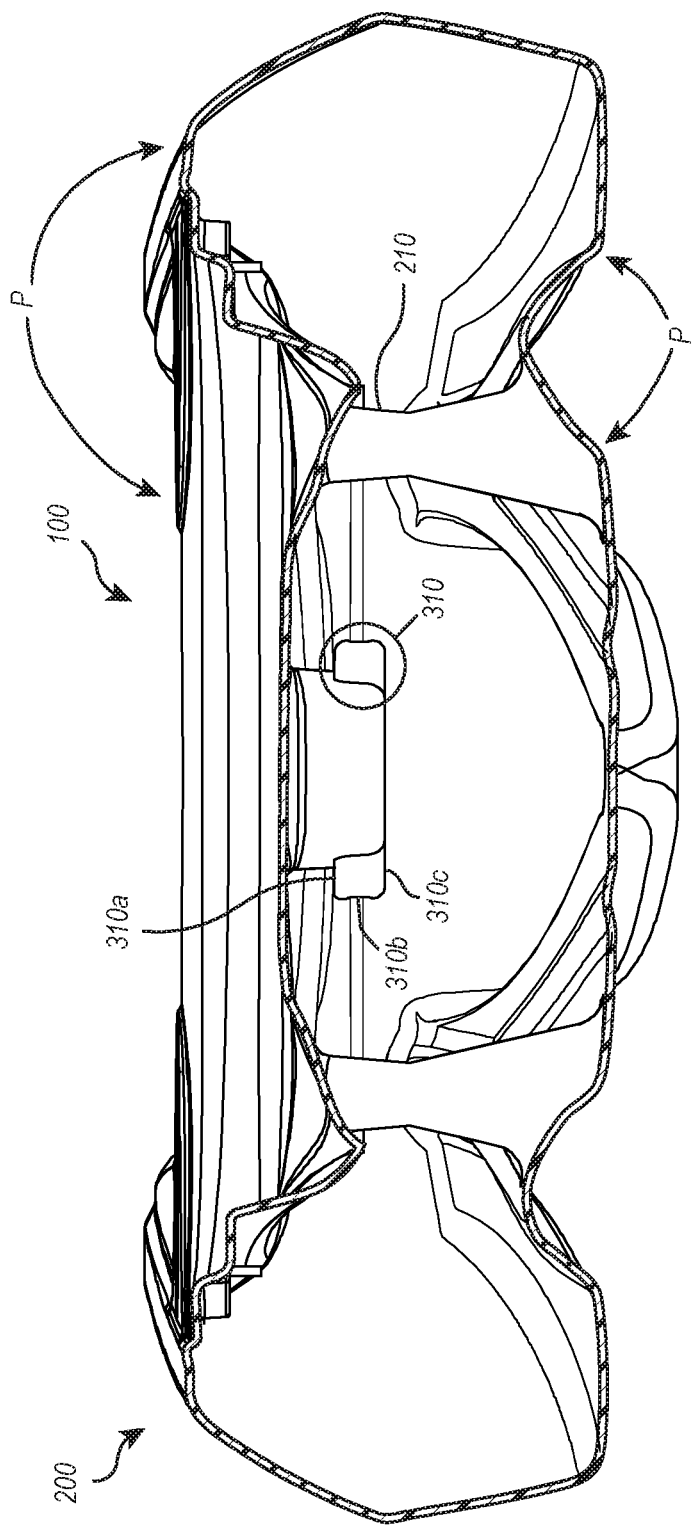
FIG. 7 is a section view of part of an example grip.
Figure 8:
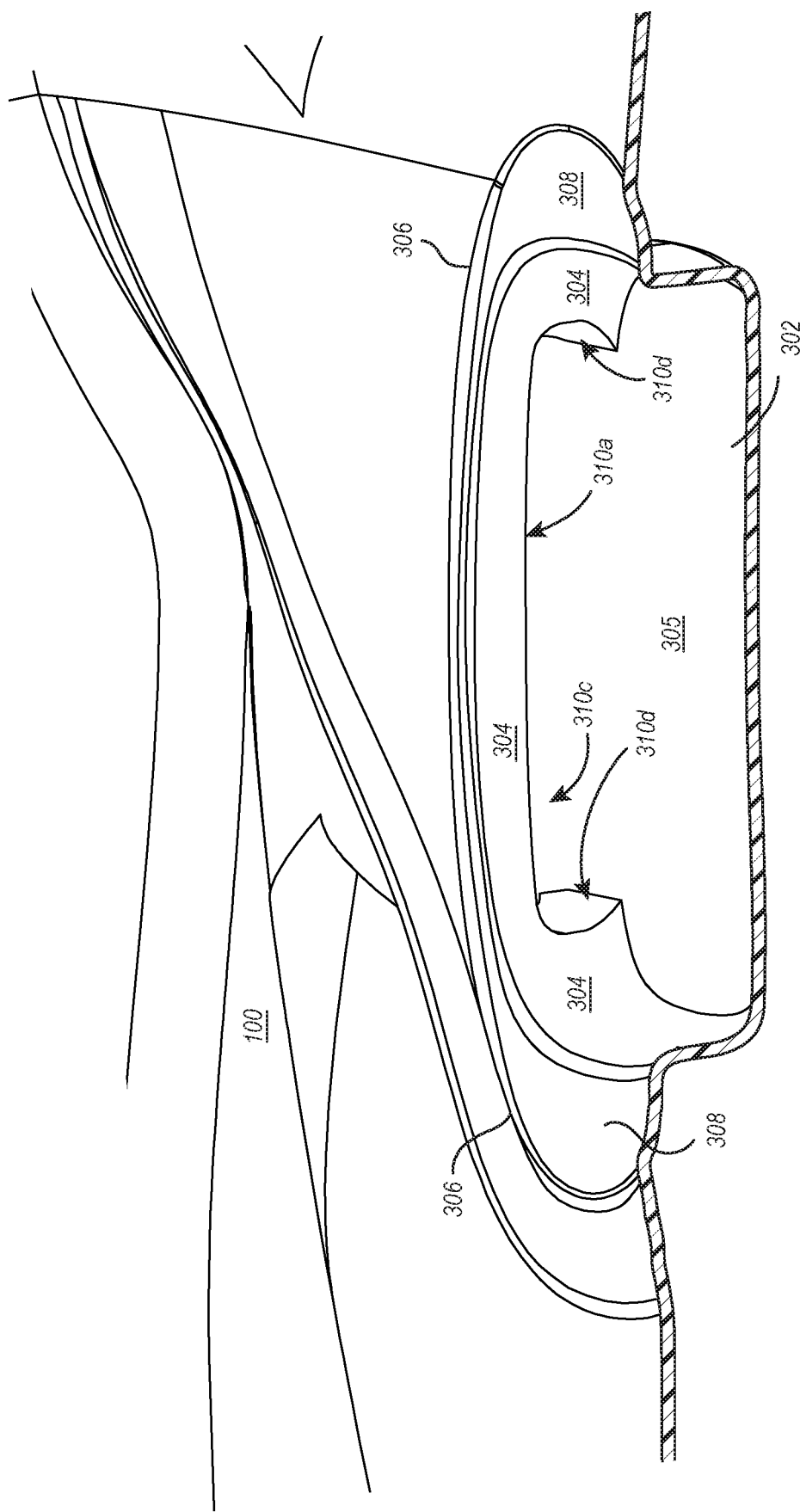
FIG. 8 is a partial side section view of an example grip.
Figure 9:
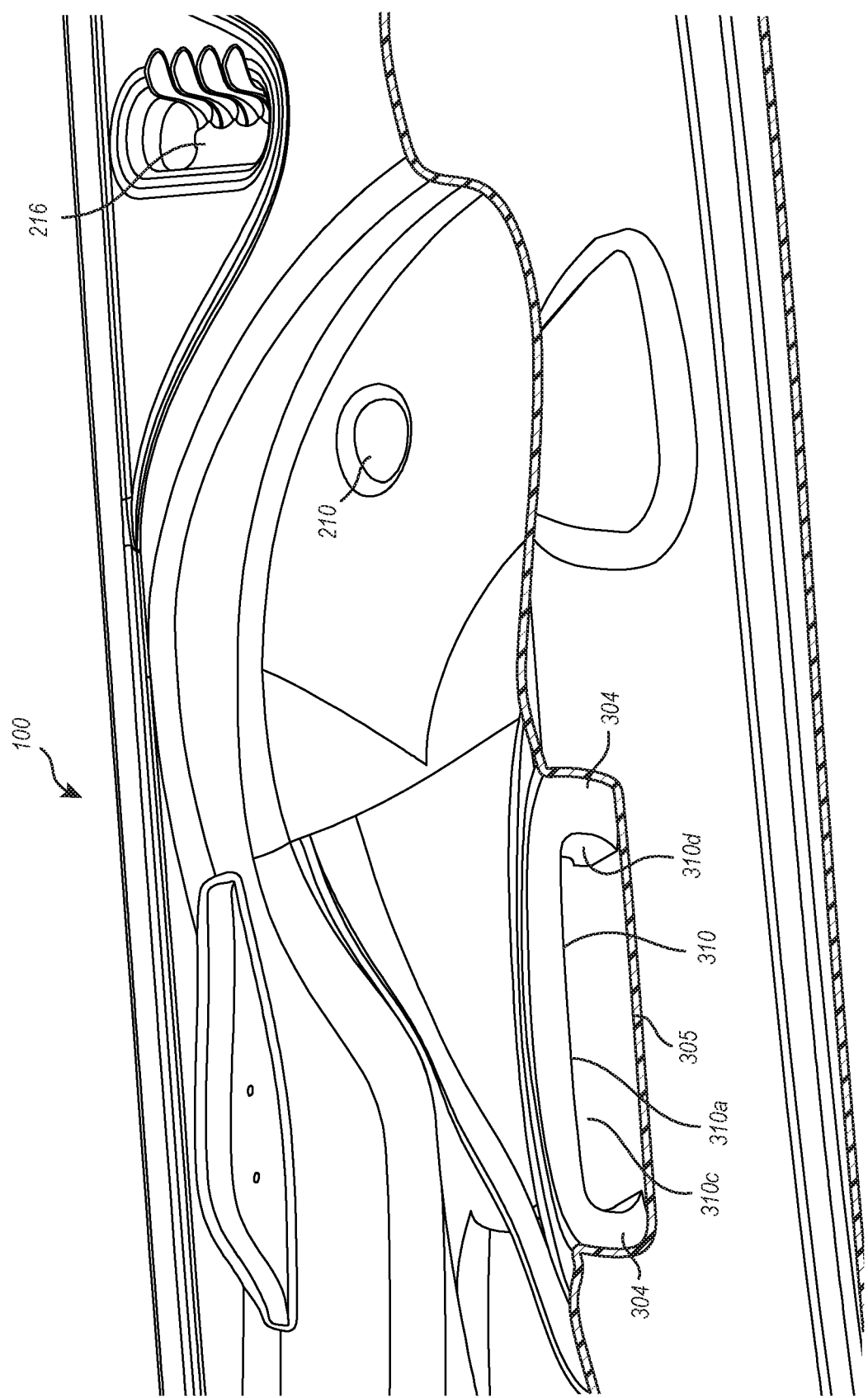
FIG. 9 is another partial side section view of an example grip undercut.
Figure 10:
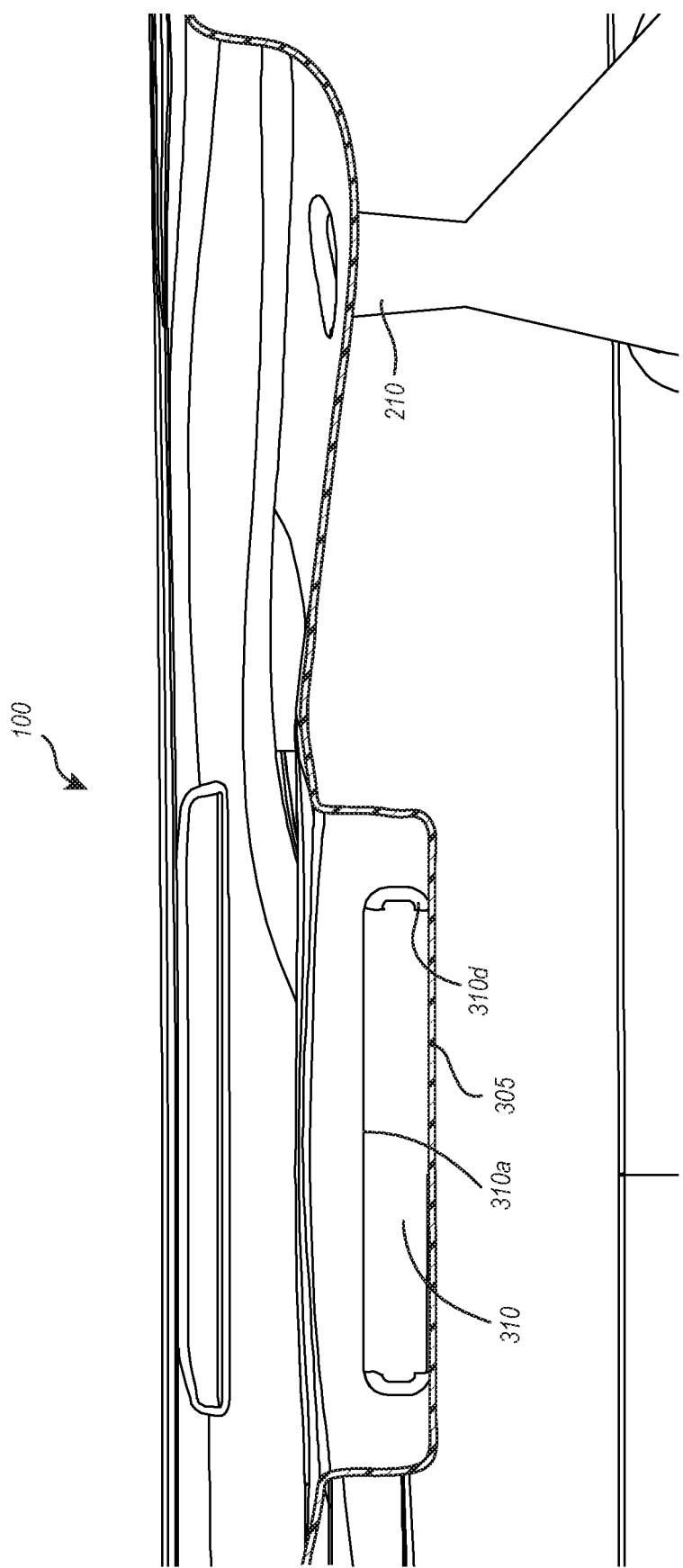
FIG. 10 is a side section view of an example grip undercut.
Figure 11:
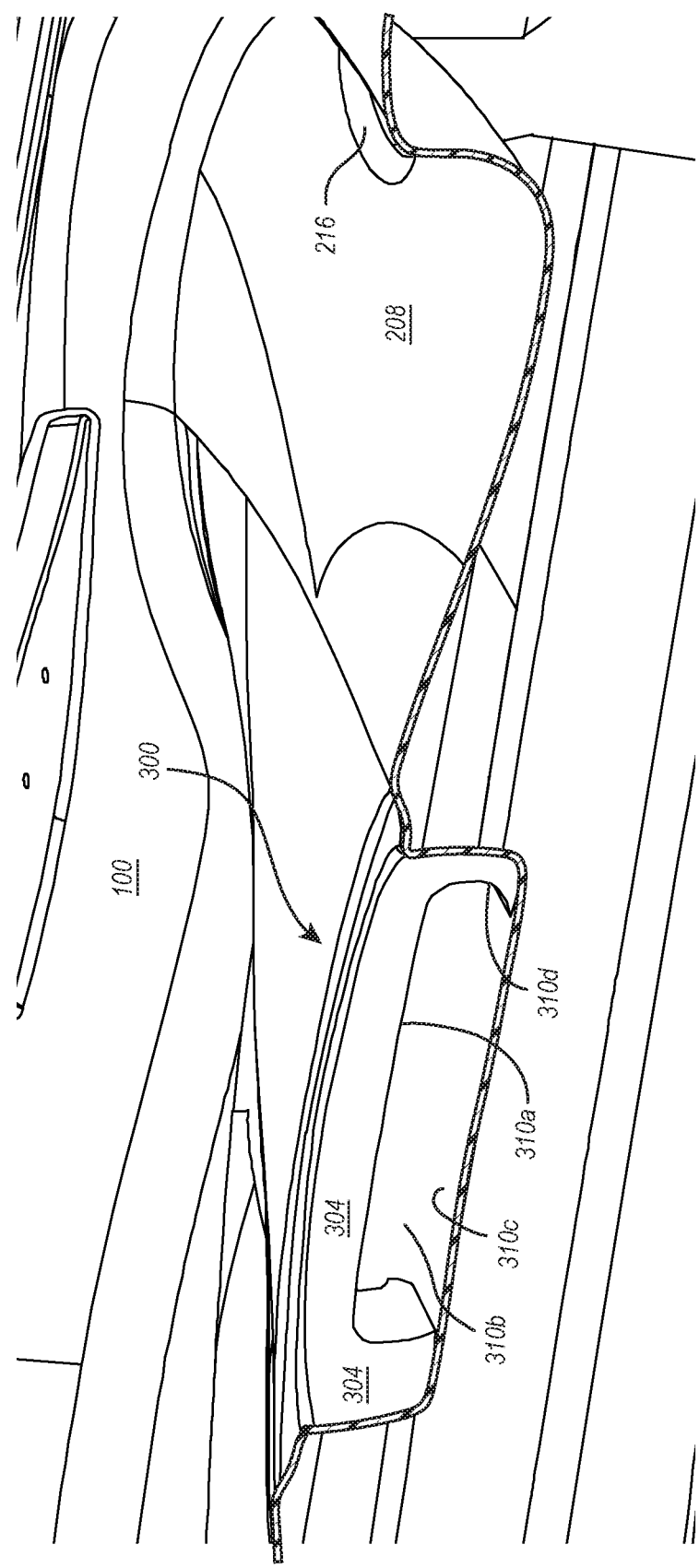
FIG. 11 is a side section view of an example grip undercut.
Figure 12:
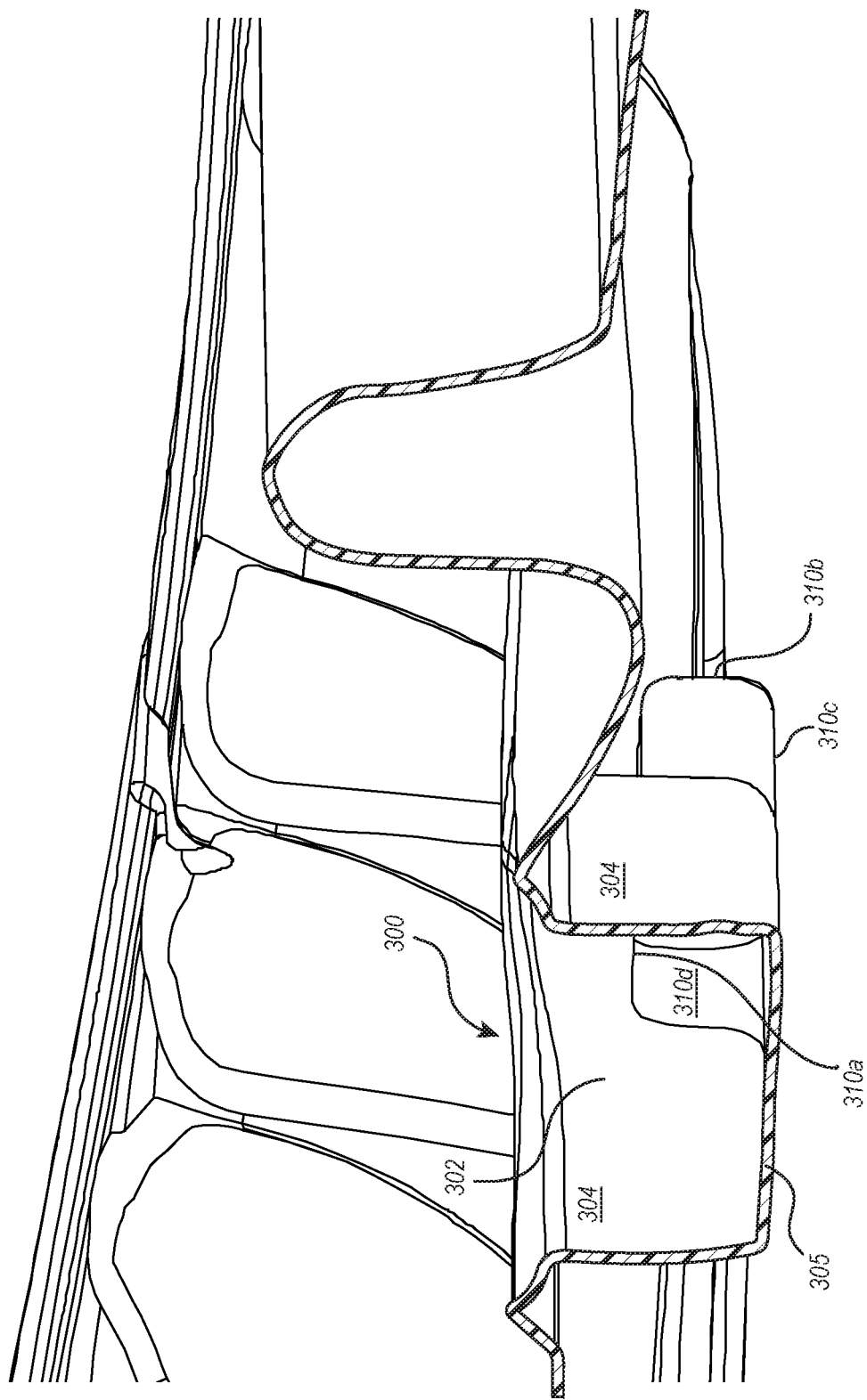
FIG. 12 is a detail view of a portion of an example grip undercut.
Figure 13:
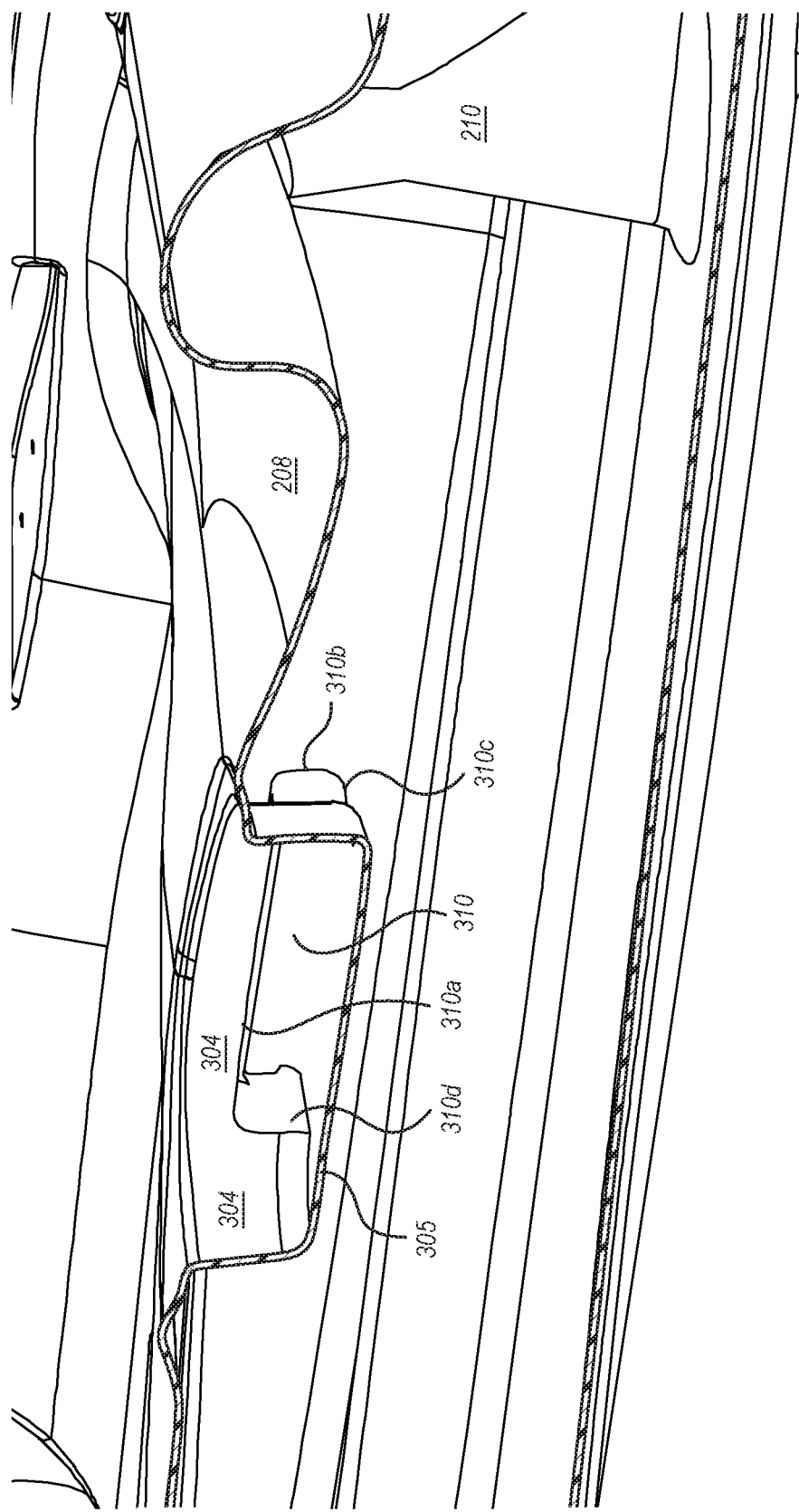
FIG. 13 is a perspective section view of an example grip undercut.

As shown in FIG. 7, discussed below, another undercut 310 can be provided near the other side of the recess 302. The two undercuts may be symmetrically arranged relative to the CL, and may be mirror images of each other in that they can have the same size, location, orientation, and configuration. This is not required however, and in other embodiments, two undercuts can be different from each other in terms of any one or more of their size, location, orientation, and configuration. Likewise, it is not required that any two undercuts be symmetric in their arrangement with respect to a reference line or reference plane. Nor is it required that multiple undercuts be provided. Rather, some embodiments of the invention include only a single undercut, whether as part of a grip, or otherwise. For example, grips with only a single undercut are also contemplated as being within the scope of the invention. Finally, and as discussed in more detail elsewhere herein, the undercuts 310 can be formed during a blow-molding process and, as such, the formation of the undercuts 310 represents a significant technological advance relative to typical blow-molding, and other molding, systems, processes and techniques.

As is also apparent from FIG. 7, the undercuts 310 can be located within, or interior to, an outer envelope defined by a perimeter P of the cross-section. In other embodiments, one or more undercuts can additionally, or alternatively, be located at or near the perimeter P. As also apparent from FIG. 7, the surfaces of the grip 300, including the recess 302 and undercuts 310, all form a part of the skin of the watercraft 100, that is, an exterior surface of the watercraft 100. As this suggests, the watercraft 100 can thus be blow molded, or otherwise formed, such that the skin of the watercraft has a continuous form that comprises, or consists of, multiple different surfaces that are integral with each other.

Further, although the illustrated undercuts 310 and recess 302 are generally oriented to be parallel to an X-axis, in other embodiments, the undercuts 310 and recess 102 can be generally parallel to a Y-axis, or can be oriented so as to be non-parallel with respect to both an X-axis and a Y-axis. More generally, any orientation of an undercut and recess can be employed, and the scope of the invention is not limited to the illustrated examples.

With continued reference to FIGS. 5-13, it can be seen that the illustrated undercuts 310 each extend about only a portion, that is, less than all, of the perimeter of the recess 302. In the illustrated example, a respective undercut 310 is located on each long side of the recess 302. In other embodiments, the undercuts 310 can be more, or less, extensive and/or can be located at different positions about the perimeter of the recess 302, such as at the forward-most and aft-most portions of the recess 302 and/or elsewhere.

In still other embodiments, an undercut can extend about an entire perimeter of a recess. For example, a circular recess may be configured with an undercut that extends about the entire perimeter of the circular recess. Non-circular recesses may likewise have an undercut that extends about their entire perimeter.

With particular reference to the section view in FIG. 7, it can be seen that the example grip 300 configuration includes two undercuts 310, each located near a respective opposing side of the recess 302. The use of multiple undercuts 310 in this way enables a user to grip and hold the watercraft 100 from either side of the watercraft 100. It can further be seen that in this example configuration, the undercuts 310 each include an upper surface 310a, a sidewall 310b, and a lower surface 310c. The locations of the upper surface 310a and lower surface 310c thus define the height of the undercut 310, while the location of the sidewall 310b defines the depth of the undercut 310. As further indicated in FIGS. 8-13, for example, a length of the undercut 310 can be defined by end walls 310d. Where embodiments of the watercraft 100 are in the form of a unified single-piece structure, the upper surface 310a, a sidewall 310b, and lower surface 310c are integral with each other, as well as with the other portions of the watercraft 100. As shown, the lower surface 310c is adjacent to, and integral with, the floor 305. The lower surface 310c and floor 305 may be located at the same depth in the recess 302 such that they lie in the same horizontal plane, while in other embodiments, one or the other of the lower surface 310c and the floor 305 slopes toward the other.

C. Recess and Tack-Offs

While not specifically illustrated, a recess, such as recess 302, for example, may take the form of a tack-off produced by a molding process, such as blow-molding. The recess 302 can take the form of a depression that is formed in an upper surface of the hull 200 and extends downward and laterally toward one or more interior surfaces of the hull such that the extents of the recess are spaced apart from the interior surface(s) of the hull 200. In an alternative embodiment, one or more portions of the recess 302, such as the bottom of the recess 302 for example, contacts an interior surface of the hull 200. In either of these embodiments, the recess 302 is considered as comprising, or consisting of, a tack-off. As noted elsewhere herein, structures such as the scuppers 210 can comprise, or consist of, a tack-off.

D. Aspects of an Example Moving Core Device

Figure 14A:
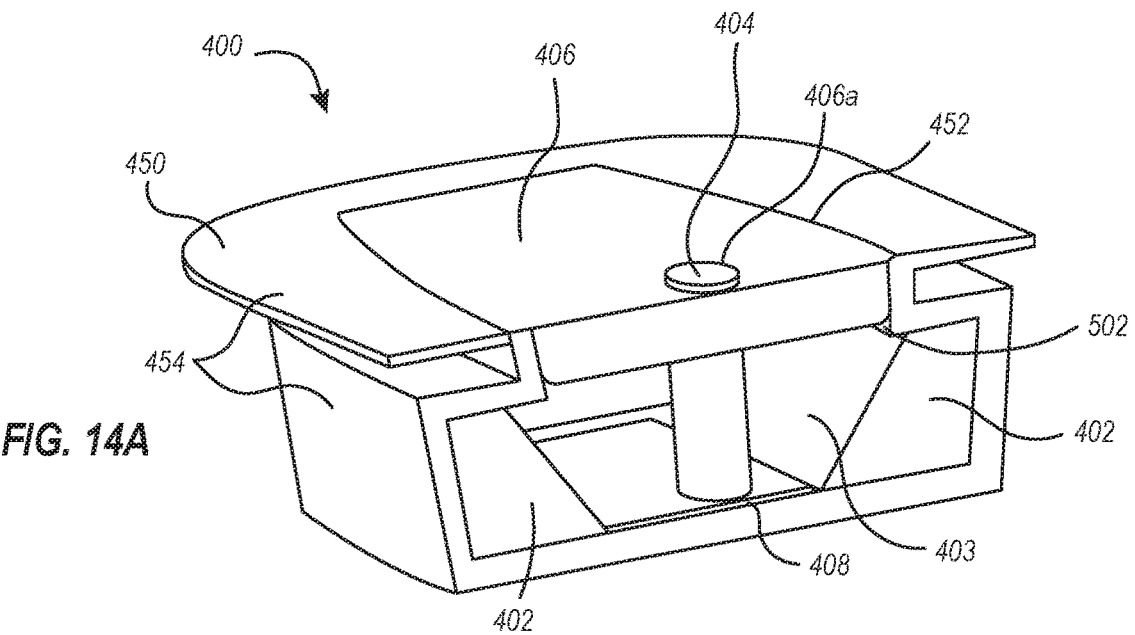
FIGS. 14a-14c show various dispositions of an example moving core device.
Figure 14B:
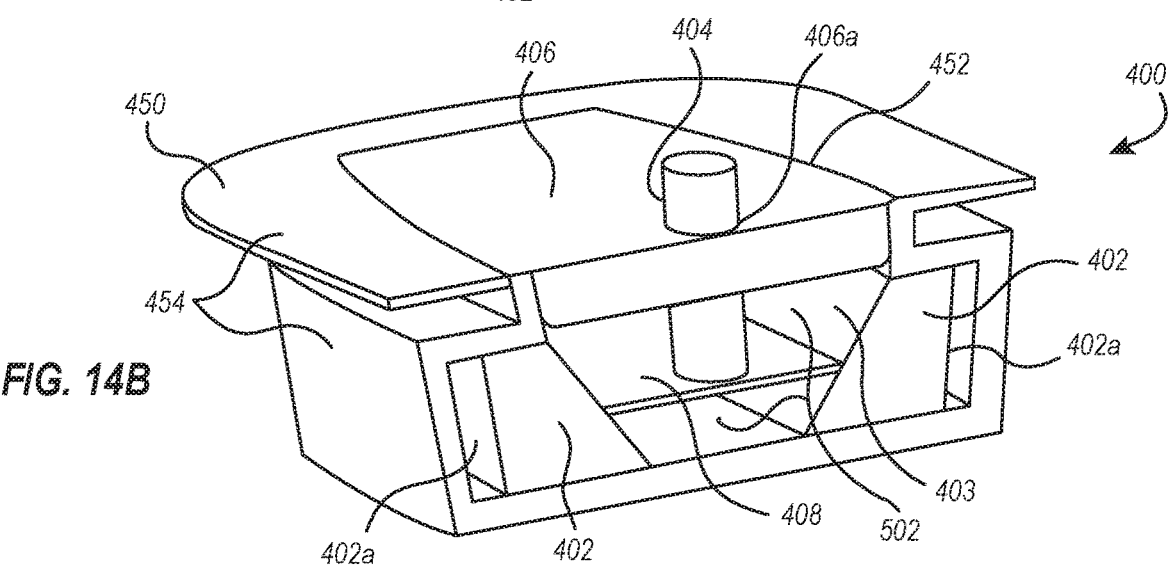
Figure 14C:
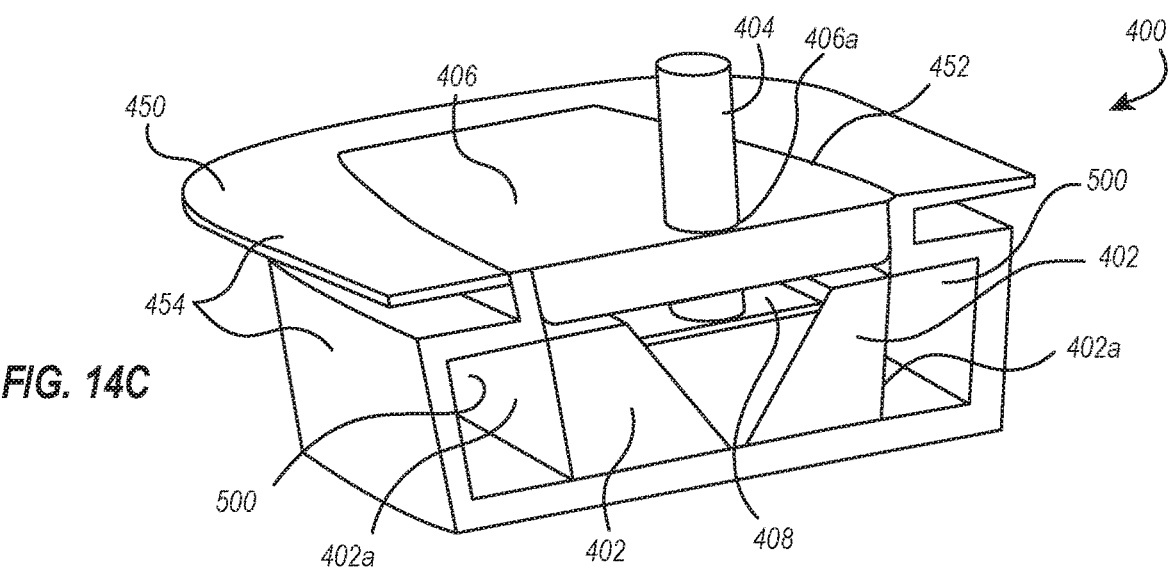

With attention now to FIGS. 14a-14c, details are provided concerning a moving core device, one example of which is denoted generally at 400, that can be used to create an integral undercut in a blow-molded, or otherwise molded, structure. As such, embodiments of the moving core device disclosed herein are example structural implementations of a means for creating an integral undercut in a molded structure, such as a blow molded structure for example. Any other mechanisms, systems, or devices of comparable functionality are considered to be embraced within the scope of this disclosure. The moving core device 400 can be built into a mold or permanently or temporarily attached or connected to the mold. The mold may be a mold used in blow-molding processes. Alternatively, the moving core device 400 can be a separate element from the mold. Moreover, a single molded structure may be created with the use of multiple moving core devices 400, and each of the moving core devices may create a respective structural feature of the molded structure.

As shown in FIGS. 14a-14c, the moving core device 400 is employed in connection with the creation of a blow molded structure 450 and can include one or more slides 402, each having an angled operating surface 403 arranged in a ramp configuration. The slides 402 may be referred to herein collectively as a moving core, and the slides 402 can be attached to, or otherwise operably engaged with, one or more plungers 404.

In some embodiments, multiple plungers 404 are used. The multiple plungers may operate independently of each other, or may operate together as a single unit. Where multiple plungers are provided, two or more of the plungers can operate simultaneously, or at different times, or during overlapping timespans. In a multiple plunger arrangement, one or more of the plungers operate in connection with one or more associated operating surfaces.

In the example of FIGS. 14a-14c, the plunger 404 is held by a guide plate 406 which constrains the plunger 404 to up and down movement (relative to the arrangement and orientation in FIG. 14). Particularly, the plunger 404 extends through an opening 406a in the guide plate 406 and is slidable within the opening 406a between the extended and retracted positions shown in FIGS. 14a and 14c, respectively. As a result of its configuration and arrangement, the guide plate 406 helps to ensure that the plunger 404 moves in such a way that the force exerted by a plunger plate 408 attached to the plunger 404 is evenly and consistently applied by the plunger plate 408 with respect to the operating surfaces 403. Depending upon the embodiment, multiple guide plates 406 can be used to define various attributes of a molded structure, such as a blow molded structure for example.

As shown in the example of FIGS. 14a-14c, attributes such as, but not limited to, the size, shape, location and orientation of the guide plate 406 can determine at least part of attributes such as the perimeter, size, shape, location and orientation of a recess in connection with which an undercut is to be created in a blow-molded structure such as the blow molded structure 450. Accordingly, the guide plate 406 can be constructed in such a way as to define at least some parameters of a desired recess and/or of other elements of a molded structure.

With continued reference to FIGS. 14a-14c, the slides 402 can be biased toward each other by a biasing element (not shown), such as one or more springs for example, so that movement of the slides 402 away from each other requires that the plunger plate 408 overcome the bias imposed by the biasing element. In some other embodiments including at least a first slide and a second slide, the first slide is fixed, and the second slide is movable relative to the fixed first slide. As is also shown in FIGS. 14a-14c, the slides 402 are movable between an extended position (FIG. 14a, and see also retracted slides 706 in FIG. 17), and a retracted position (FIG. 14c, and see also extended slides 706 in FIG. 16).

In general, the respective geometries of the slides 402 and the plunger 404 are such as to partly, or completely, define the configuration of an undercut 500 that is to be created in a molded structure such as the blow molded structure 450. For example, the width of the plunger plate 408 at least partly defines the extent to which the slides 402 will be laterally displaced. As such, and in view of the slide 402 geometry, the plunger plate 408 contributes to the definition of the depth (in the lateral direction) of the undercut 500. In a similar fashion, the lateral width W, and the height H, of the slides 402 contribute to definition of the depth and height, respectively, of the undercut 500.

In the example of FIGS. 14a-14c, the slides 402 have the same respective configurations. In other embodiments however, the slides 402 can have different respective configurations, such that corresponding undercuts of different respective configurations can be created.

As the foregoing discussion of the example of FIG. 14 makes clear, the size, shape, orientation, and location of the undercut 500 can be defined through the use of moving core device 400 components having specific shapes and sizes. For example, the lateral width W and/or height H of the slides 402 can be modified. As another example, an outer surface 402a of one or both slides 402 could be curved, so as to produce an undercut with a concave or convex wall. Similarly, a bottom surface 402b of one or both slides 402 could be curved, so as to produce an undercut with convex or concave lower surface. As well, the angle of the operating surfaces 403 on the slides 402 can be changed. In addition to taking various different shapes such as the examples noted above, one or more surfaces of the slides 402 that contact plastic of the blow molded structure 450 may have texturing and/or other treatments that are desired to be produced in the resulting undercut of the blow molded structure 450. As a final example, the width of the plunger plate 408 can be modified.

As demonstrated by the example of FIGS. 14a-14c, embodiments of a moving core device have a modifiable configuration. In the particular example of the aforementioned figures, the moving core device includes a moving core that has a modifiable configuration in which one, some, or all, elements of the moving core are configured and arranged to assume different respective positions or states. In embodiments disclosed herein, changes in the position or state of a moving core element and, thus, the movement of a moving core element, occur during a molding process, such as a blow molding process for example. In some embodiments, changes in the position of an element of a moving core occur automatically during, and/or as a result of, the performance of a production process such as a blow molding process. By way of illustration, and as noted herein, while the plastic of a partly or completely molded element, such as a blow molded element for example, cools and hardens, two slides and a plunger of a moving core device positioned in a mold with the molded element move automatically from an extended position into a retracted position. The ability of the moving core device to change configurations has other implications as well. For example, and as best shown in FIG. 14c, the configuration of the moving core device is such that the moving core device can change its size and/or configuration to the extent that the moving core can be easily ejected, or otherwise removed, from the molded part. In the particular example of FIG. 14c, the slides 402 have moved together to the extent that the overall width of the moving core is smaller than a width of an opening 452 defined in the blow molded structure 450. As a result, the moving core can pass through the opening 452 and out of the blow molded structure 450.

In operation, the configuration and arrangement of the slides 402 and plunger 404 is such that as the plunger 404 is depressed downwardly, the plunger plate 408 moves the slides 402 laterally apart from each other, in a linear fashion in this example, until the slides 402 assume the respective positions indicated in FIG. 14a. Thus, a movement of the plunger 404 along a first axis, which may be a vertical axis, causes a movement of the slides 402 along a second axis, which may be a horizontal axis, that is not parallel to the first axis. In some embodiments, the first and second axes are perpendicular to each other, although that is not required.

The plunger 404 and slides 402 can be retained in this position by gravity, or a mechanism (not shown) that holds the plunger 404 in the depressed position. When the guide plate 406, plunger plate 408 and slides 402 have been positioned as thus described, attributes such as the desired size, shape, location and orientation of the undercut 500 and associated recess 502 are thereby defined. Moving core device 400 elements such as the slides 402 and guide plate 406 may be referred to herein as definition elements, as they serve to at least partly define part of a structure, such as a recess and an undercut for example, as the structure is created by a molding process.

With continued reference to FIG. 14a in particular, the slides 402 and guide plate 406 are placed into the indicated respective positions before any plastic 454 has come into contact with the moving core device 400. In some instances, the moving core device 400 can be placed into the illustrated disposition prior to being disposed in the mold (not shown), while in other instances, the moving core device 400 can be placed into the illustrated disposition after being disposed in the mold.

With particular reference now to FIGS. 14b-14c, as the plastic 454, in molten form, conforms around the slides 402 and guide plate 406 as part of a blow-molding, or other molding process, the undercut 500 and recess 502 are formed in the molded structure. As shown in FIG. 14a, the slides 402 are initially trapped in the undercut 500. However, when the plastic has sufficiently cooled and hardened, the plunger 404 can be retracted. Retraction of the plunger 404 can occur automatically as a result of the cooling, hardening and contraction of the plastic, or can be performed by a machine. As the plunger 404 is retracted, the slides 402 move toward each other, as shown in the middle view of FIG. 14. Automatic movement of the slides 402 toward each other can occur as the result of a bias imposed on the slides 402 by a biasing element (not shown). Depending upon its configuration and arrangement, the biasing element(s) can push, or pull, the slides 402 together. In some embodiments, the biasing element can be eliminated, and the slides 402 can move together under another influence, such as gravity and/or physical changes to the plastic such as cooling, hardening, and/or contraction.

In any case, once the moving core comprising the slides 402 has assumed the state or configuration indicated in the bottom view of FIG. 14c, that is, a position in which the slides 402 have moved out of the undercut 500, the moving core device 400 can then be removed from the blow-molded structure. If desired, the moving core device 400 can be reused in the construction of another blow-molded structure.

E. Aspects of an Example Method

Figure 15:
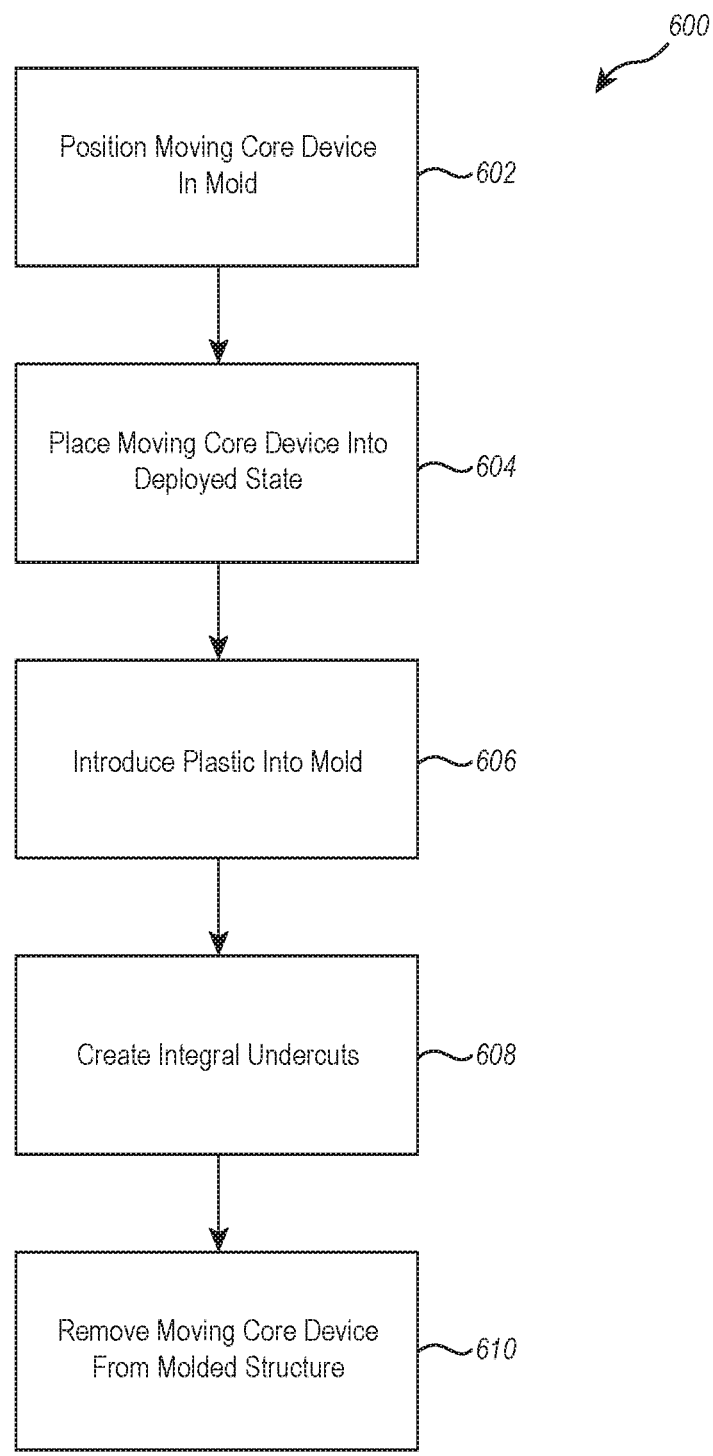
FIG. 15 discloses an example method for molding an undercut.

Turning next to FIG. 15, details are provided concerning a method, one example of which is denoted at 600, for creating an integral undercut in a molded structure. The molded structure can be a boat such as a kayak, having a unitary one-piece structure that is hollow, or substantially hollow. This unitary one-piece structure can include one or more tack offs. Other example structures that can be formed by embodiments of the method 600 include, but are not limited to, the example structures and other water craft disclosed herein.

The example method can begin at 602 where a moving core device is positioned in a mold. The moving core device can be directly connected to the mold, or indirectly connected to the mold by way of one or more intervening structures. As well, the moving core device can be permanently, or removably, connected to the mold. The mold can be configured for use in connection with any of the molding processes disclosed herein, including a blow-molding process.

Next, the moving core device can be placed into a first state, such as an extended state 604. In this state, the configuration of the moving core device is such that the moving core device will define part or all of an undercut when plastic is allowed to conform around definition elements of the moving core device. The moving core device may additionally define, either in whole or in part, other structural features, such as a recess for example, of the structure that is being molded. Such other structural features can be created by the moving core device at the same time as the undercut is created by the moving core device. Even if the undercut and other structural features are not created at the same time as each other, the undercut and other structural features may nonetheless all be created during a single molding process. It should be noted with respect to the aforementioned processes that in some alternative embodiments, the order in which the processes 604 and 602 are performed can be reversed, with 602 being performed subsequent to 604.

Next, plastic is introduced 606 into the mold where the moving core device is located and, in a blow-molding process for example, compressed air or other compressed gas is also introduced into the mold to help ensure distribution of the molten plastic throughout the interior of the mold. As the plastic flows about, and conforms to the outer shape of the definition elements of the moving core device, one or more undercuts are created 608 that are integrally formed with the structure that is being created. Thus, the undercuts can be integral with a unified single-piece structure such as can be formed by blow-molding and other molding processes. In some embodiments, one or more of such undercuts comprise an element of a grip, such as can be used in a watercraft for example. Thus, the grip and its undercut(s) are formed from, or as part of, the outside skin of the unitary single-piece structure. In some other embodiments of a method, structural features other than undercuts are additionally, or alternatively, created with the moving core device.

After the plastic has cooled and hardened sufficiently, the moving core device can be removed 610 from the molded structure. In connection with this removal, the moving core device can be manually or automatically changed to a retracted state in which, for example, a plunger is fully retracted, and a pair of slides have moved out of the molded undercuts to the extent necessary to enable the moving core device to be removed from the molded structure.

Figure 16:
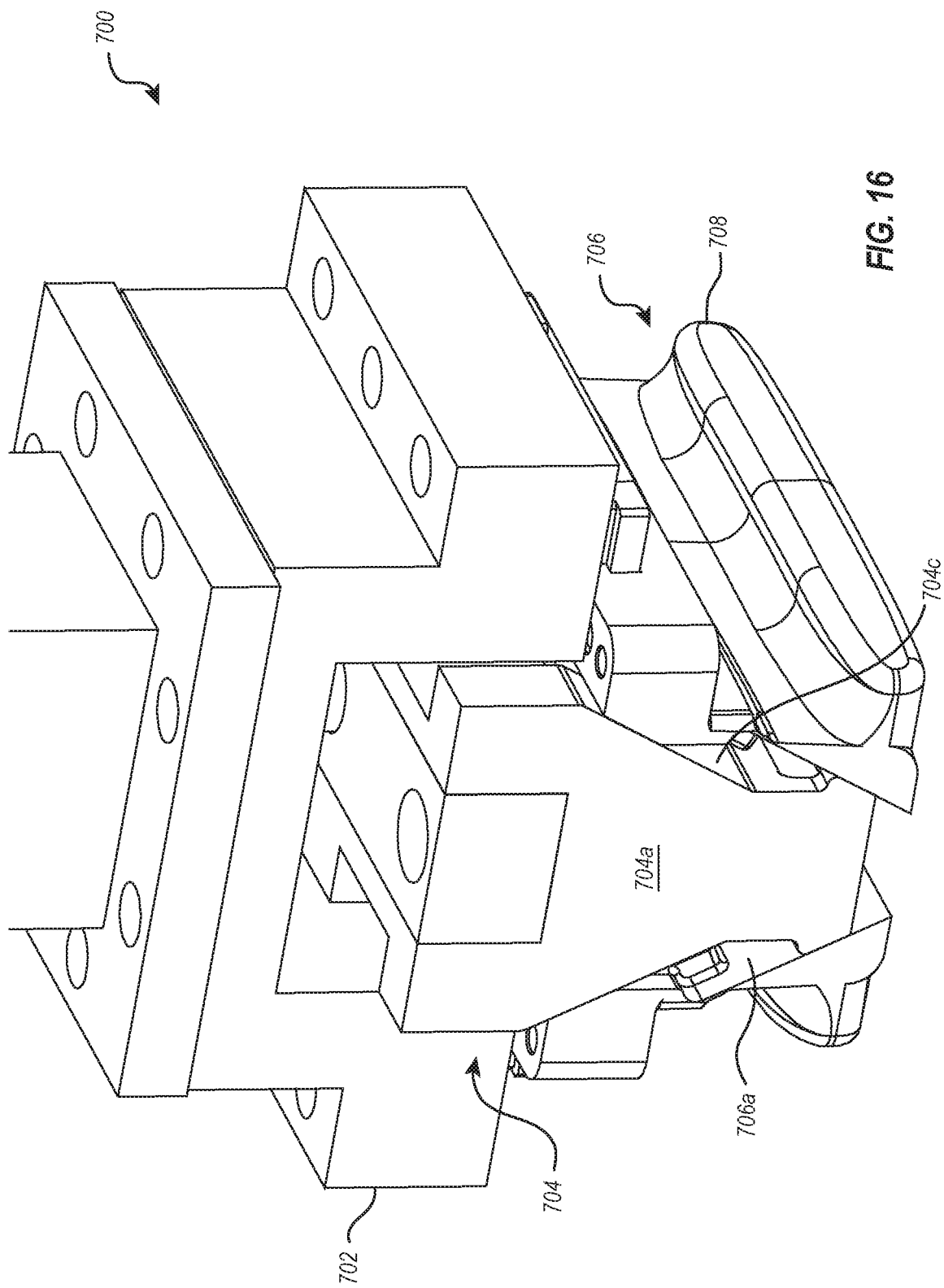

With reference now to FIGS. 16 and 17, details are provided concerning another example of a moving core device, denoted generally at 700. FIGS. 16 and 17 are largely concerned with various operational configurations or dispositions of the moving core device 700, while FIGS. 18a-18f, discussed below, provide further details concerning the physical configuration, and operations, of the moving core device 700.

In general, the principal of operation of the moving core device 700 is similar to that of the moving core device 400, although as discussed below, the two devices differ in their respective physical configurations. As well, the moving core device 700 can be used in a process such as the method 600 discussed above, although that is not required and the moving core device 700 can be used in other processes.

In particular, the moving core device 700 includes a head 702 within which a plunger 704 is able to move back and forth between the positions collectively indicated in FIGS. 16 and 17, as indicated by the arrows on the plunger 704. The plunger 704 is shown in an extended state in FIG. 16, and a retracted state in FIG. 17. Movement of the plunger 704 can be effected by any suitable mechanism. Such a mechanism can be manually operated, electrically operated, hydraulically operated, or operated by compressed air, for example. The plunger 704 is generally configured and arranged to operably engage first and second slides 706 such that as the plunger 704 descends (FIG. 16), the slides 706 are pushed apart by the plunger 704, and as the plunger 704 is retracted (FIG. 17), the slides 706 move toward each other. In general, this is accomplished, in some embodiments at least, through the use of respective complementary structures of the plunger 704 and slides 706.

Figure 18A:
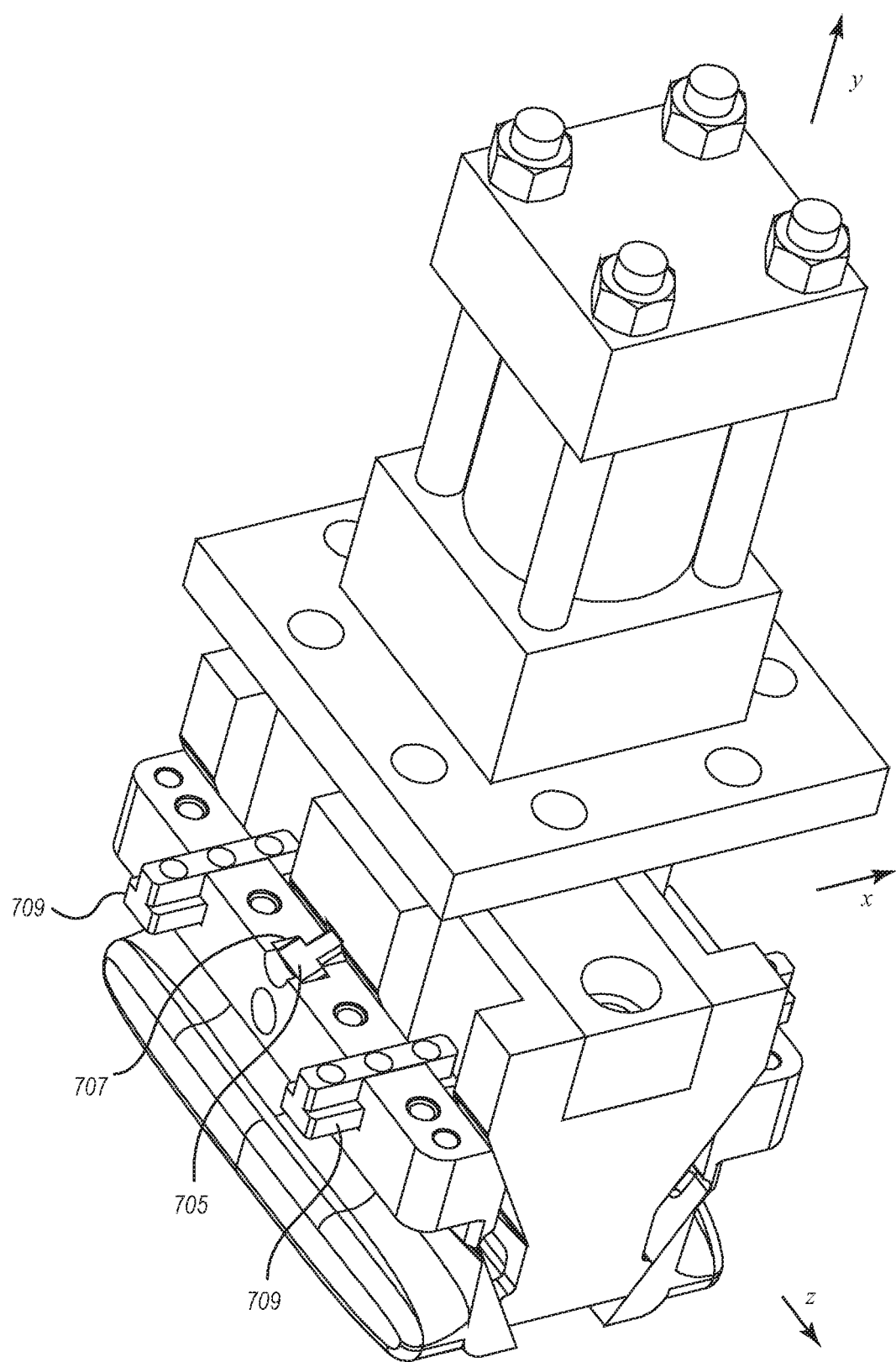
FIGS. 18a-18f disclose aspects of the configuration of an example moving core device.
Figure 18B:
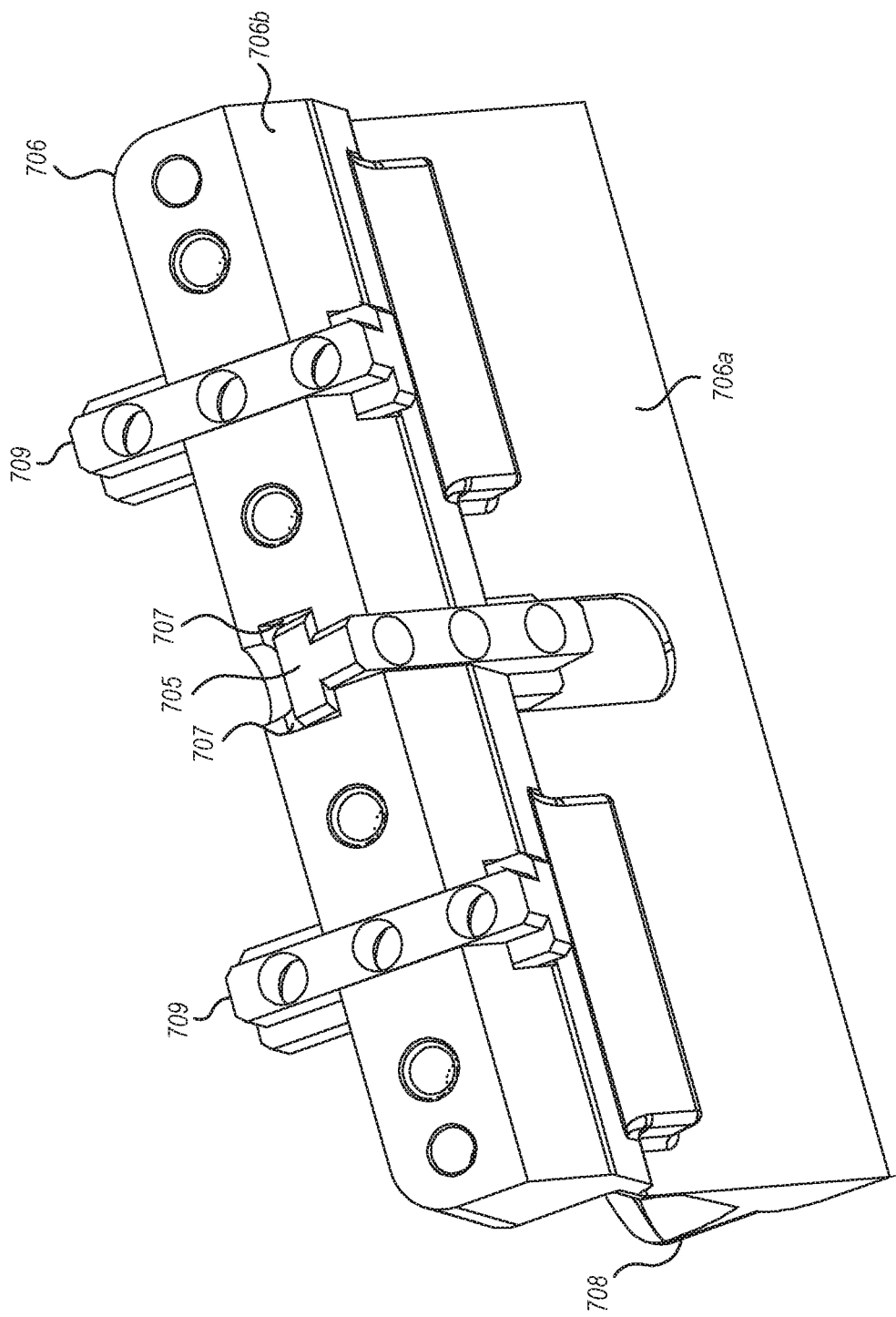

In more detail, and as shown in FIGS. 18a and 18b, each side of the plunger 704 includes one or more tabs 705 having a generally T-shaped construction configured and arranged so that the top of the "T" portion is slidingly received in a corresponding channel 707 defined in each of the slides 706 and disposed at an angle relative to a vertical axis "Y" passing through the plunger 704. Thus, the tab 705 and corresponding channel 707 respectively comprise complementary structures of the plunger 704 and slide 706.

The channel 707, which can also have a generally "T" shaped configuration, is relatively wider at its bottom than at its top. The tabs 705 and channels 707 are configured so that the relatively wider portion of a tab 705 is received in the relatively wider portion of a corresponding channel 707 and, as such, the tab 705 cannot pull out of the channel 707 in which it is received.

With the tabs 705 and channels 707 configured and arranged as just described, it can be seen that an upward movement of the plunger 704, to which the tabs 705 are attached, pulls the slides 706 together, while a downward movement of the plunger 704 pushes the slides 706 apart. In the former circumstance, because the tab 705 is confined in the channel 707, an upward motion of the plunger 704 causes a corresponding movement of the tab 705. This movement of the tab 705 has both vertical and horizontal components, and corresponding vertical and horizontal forces are exerted by the tab 705 on the structure of the channel 707. However, because vertical movement of the slide 706 is substantially or completely prevented, due to the fact that the slide 706 is constrained to lateral motion along tracks 709, the upward movement of the plunger 704 causes only a horizontal, inward, movement of the slide 706, while downward movement of the plunger 704 causes only a horizontal, outward, movement of the slide 706.

Figure 18C:
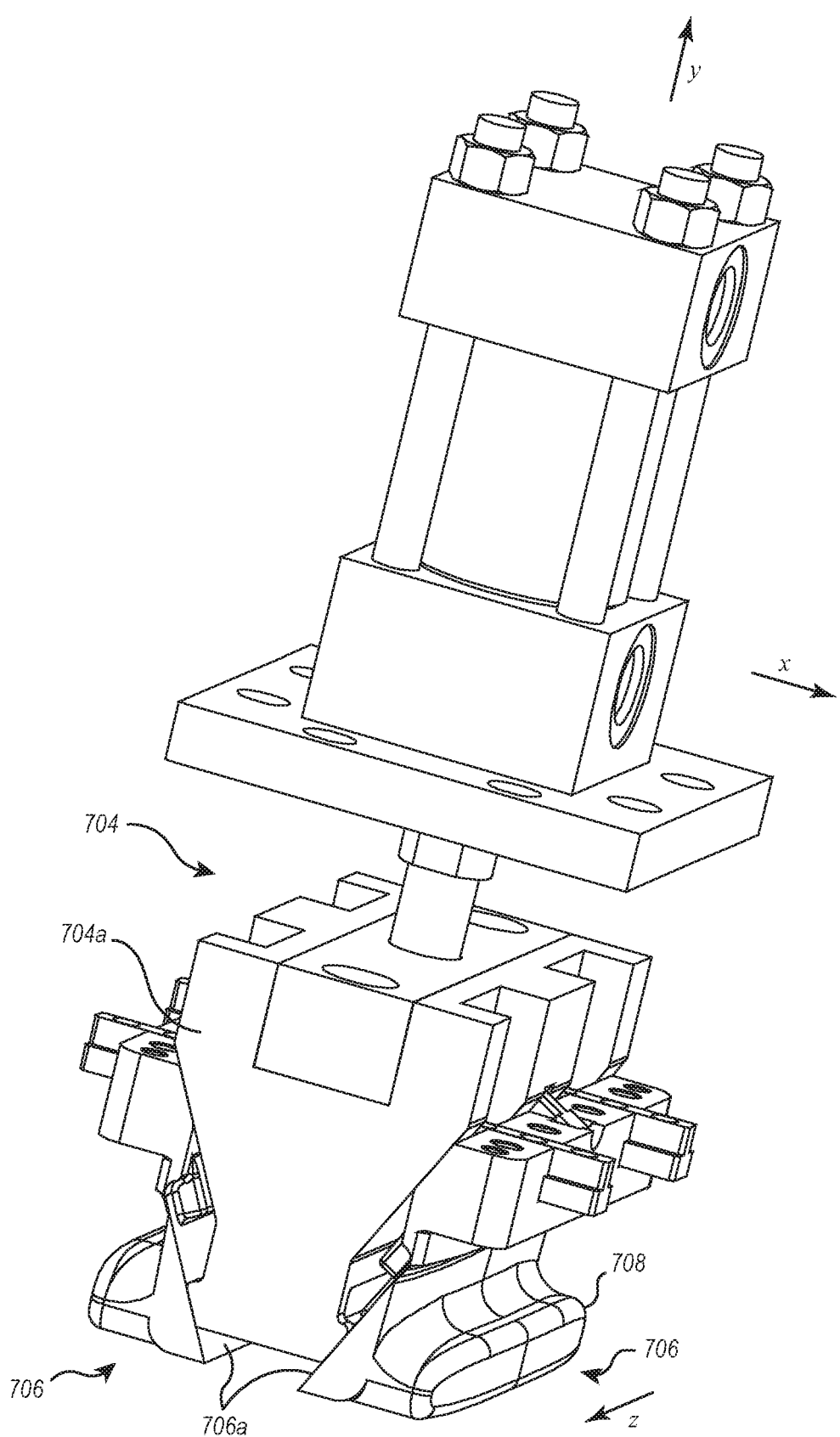
Figure 18D:
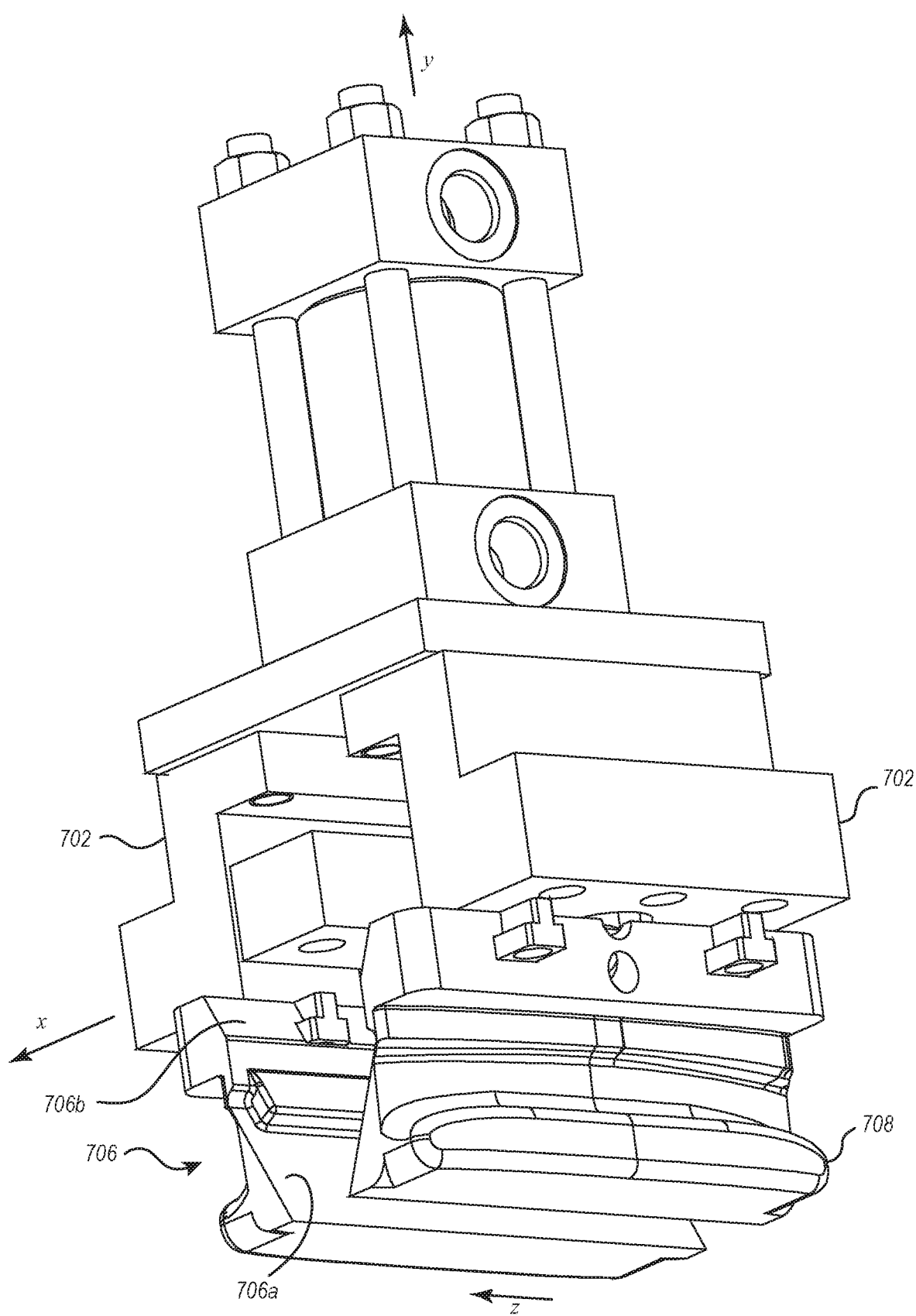
Figure 18E:
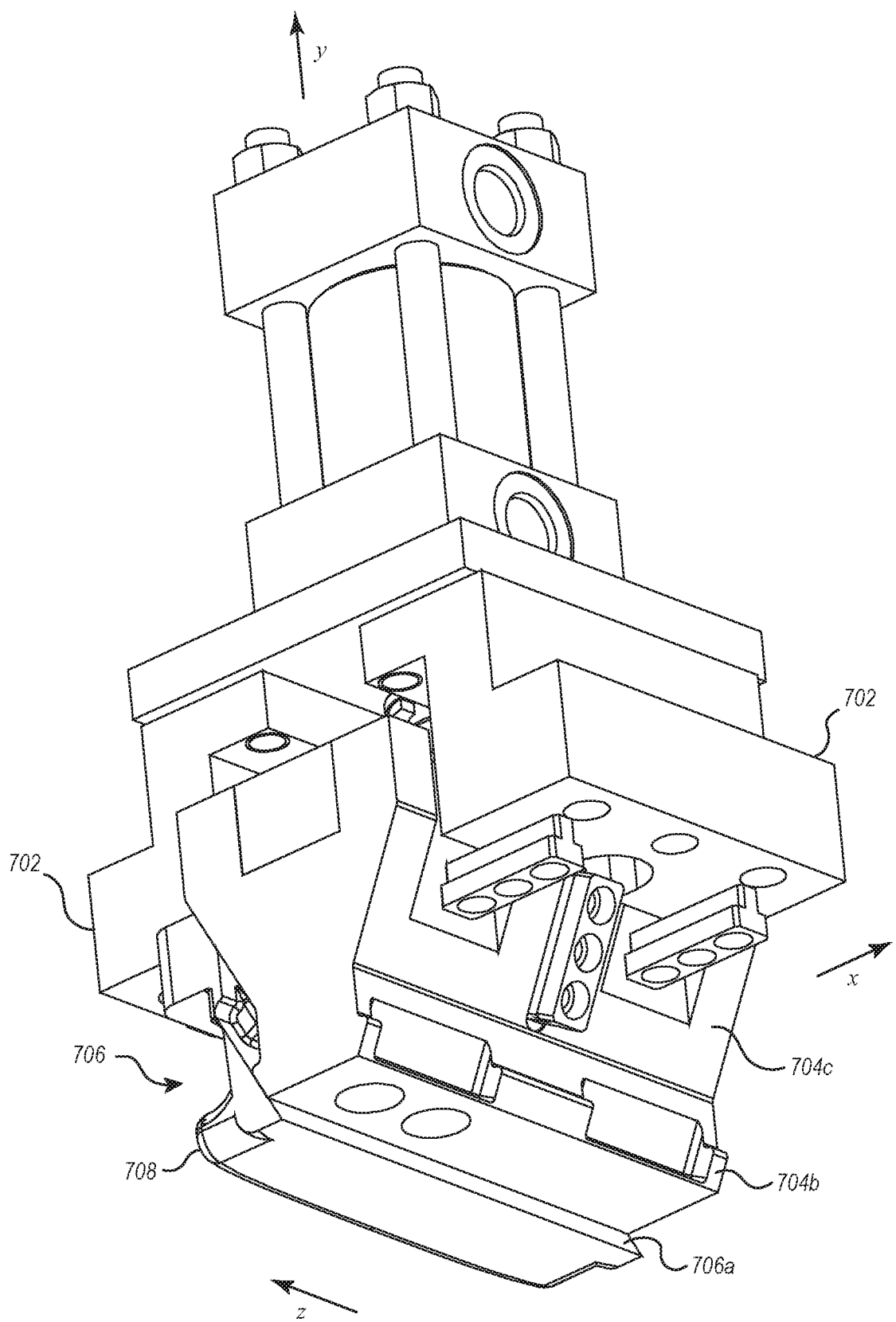
Figure 18F:
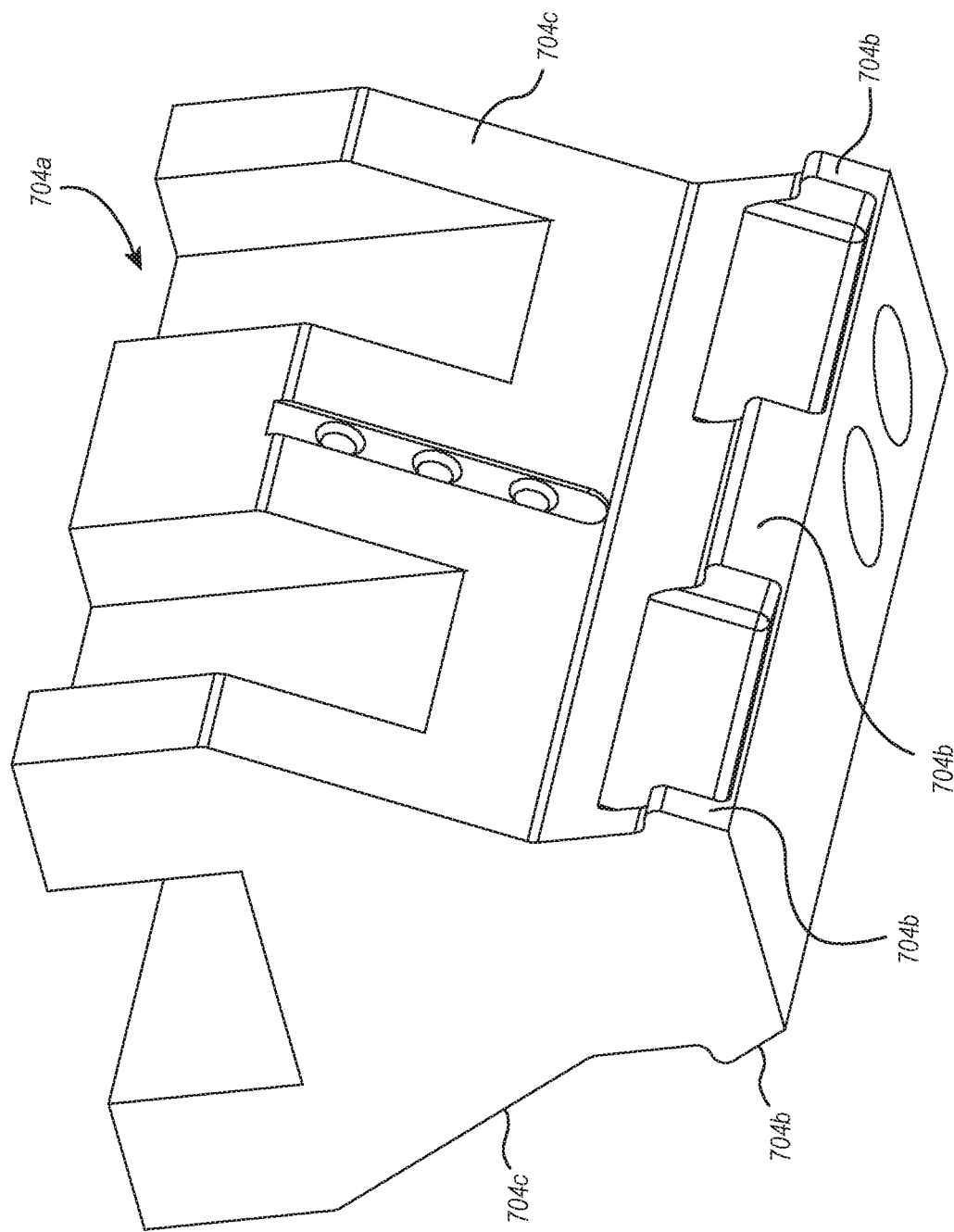

With continued reference to FIGS. 16 and 17, as well as FIGS. 18c-18f, further details are provided now concerning the configuration and operation of example embodiments of a plunger and slides. In particular, the plunger 704 includes a body portion 704a that can include a generally wedge-shaped portion having opposing angled surfaces 704b. The angled surfaces 704b are configured to slidingly engage corresponding angled surfaces 706a of the slides 706. The body portion 704a also includes opposing angled surfaces 704c which are configured and arranged to slidingly engage the angled surfaces 706b. In the example of FIGS. 18c-18f, the angled surfaces 704b and 704c are disposed at approximately the same angle as each other, and at approximately the same angle as the angled surfaces 706a. In other embodiments, the angled surfaces 704c/706b may define a different angle than the angled surfaces 704b/706a. As best shown in FIGS. 18c and 18e, the angled surfaces 704c can act on the angled surfaces 706b at the same time as the angled surfaces 704b act on the angled surfaces 706a. As such, this example plunger 704 implements a dual wedge configuration.

Thus configured and arranged, the plunger 704 employs a wedge effect to push the slides 706 apart from each other. Among other things, the dual wedge configuration helps to ensure steady and reliable movement of the slides 706 by contacting the slides 706 at two different vertical locations, and thus also lends stability to the operation and movement of the plunger 704 with respect to the slides 706. The dual wedge configuration of the plunger 704, in cooperation with the slide 706 geometry, also defines an extent to which the slides 706 can be moved apart from each other. As well, the stroke, or distance that the plunger 704 must travel to move the slides 706 apart or allow the slides 706 to move together, can be made shorter or longer by varying the angle of the angled surfaces 704c/706b and the angle of the angled surfaces 704b/706a.

With further attention now to FIGS. 18c-18f, it can be seen that the slides 706 each define a respective opposing protrusion 708 which form respective undercuts in a molded structure when a material such as plastic is formed around the protrusions 708. Thus, the protrusions 708, by virtue of their geometry, define the length, depth and height of a corresponding undercut in a molded structure, such as a kayak or paddleboard for example. As well, when the plunger 704 is in the extended position (FIG. 16), the distance between the outermost edges 708a of the protrusions 708 defines an overall width of an opening (see, e.g., 302 in FIG. 7) that communicates with the undercuts.

It should be noted that while the example slides 706 each define a protrusion 708, other embodiments can be employed that define only a single protrusion, and the scope of the invention is not limited to the example of FIGS. 18a-18f. As well, the geometry of the protrusions 708 is presented only by way of example, and it will be appreciated that any other protrusion geometry that enables creation of an undercut, or undercuts, having a desired shape, size, orientation, and location can alternatively be used. Further, while the protrusions 708 are similar to each other in terms of their size, configuration, location and orientation, such is not required. Thus, in alternative embodiments where multiple protrusions are provided, the protrusions may differ from each other in any one or more of their respective size, configuration, location and orientation. In this way, a single moving core device can enable creation of two different undercuts.

Moreover, in at least some embodiments, a plurality of moving core devices can be used in connection with the molding of a single structure. In this way, multiple undercuts, which can have the same, or different, respective configurations can be created simultaneously, or nearly so, in a single molded structure, and as part of a single molding process.

Finally, the various components of the moving core devices disclosed herein can be made of any suitable materials. By way of example, one, some, or all, of the head, guide plate, slides and the plunger can be made of metal, such as steel or aluminum for example. Other metals, or other non-metallic materials such as ceramics, composites, carbon and/or graphite, could alternatively be used however for construction of the disclosed embodiments of a moving core device and its components.

Operationally, the moving core device 700 may be similar to the moving core device 600. Thus, the moving core device 700 can be initially placed in a mold, and the plunger 704 moved to the deployed position of FIG. 16. After the plastic has been molded around the protrusions 708 and allowed to cool and harden sufficiently, the plunger 704 is retracted and the slides 706, which can be biased by a spring or other element, or may be pulled together by movement of the plunger 704, move towards each other, assuming the arrangement shown in FIG. 17. At this point, the slides 706 have retracted completely from the undercuts (not shown) that were created during molding, and the moving core device 700 can then be removed from the molded structure (not shown, but see, e.g., FIG. 7).

F. Additional Example Embodiments

Following is a listing of additional example embodiments of the invention.

Embodiment 1

An apparatus, comprising: a unitary, single-piece structure that is substantially hollow, and made of plastic; and one or more undercuts that are integral with the unitary single-piece structure.

Embodiment 2

The apparatus as recited in embodiment 1, wherein one of the undercuts is part of a grip that is integral with the unitary single-piece structure.

Embodiment 3

The apparatus as recited in embodiment 1, wherein the apparatus is a kayak or paddleboard.

Embodiment 4

The apparatus as recited in embodiment 1, wherein the apparatus includes one or more tack offs that are integral with the unitary, single-piece structure.

Embodiment 5

The apparatus as recited in embodiment 1, wherein the apparatus is other than a watercraft.

Embodiment 6

A watercraft, comprising: a hull in the form of a unitary, single-piece structure that is substantially hollow, and made of plastic; and a grip including one or more undercuts that are integral with the hull.

Embodiment 7

The watercraft as recited in embodiment 6, wherein the watercraft is either a kayak or a paddleboard.

Embodiment 8

The watercraft as recited in embodiment 6, wherein the grip comprises a recess that is integral with the hull, and also comprises first and second integral undercuts disposed proximate respective opposing sides of the recess.

Embodiment 9

The watercraft as recited in embodiment 6, wherein one of the integral undercuts is sized and configured to accommodate portions of one or more fingers of the hand of a user.

Embodiment 10

The watercraft as recited in embodiment 8, wherein one undercut extends around less than an entire perimeter of the recess.

Embodiment 11

The watercraft as recited in embodiment 8, wherein the grip is positioned within an outer envelope defined by a perimeter P of a cross-section of the watercraft.

Embodiment 12

A moving core device, comprising: a first movable portion configured to define part of an undercut when plastic is formed around the first movable portion in a mold; and a second movable portion disposed in an operational relationship relative to the first movable portion such that movement of the second movable portion results in a corresponding movement of the first movable portion.

Embodiment 13

The moving cover device as recited in embodiment 12, wherein the first movable portion is a slide, and the second movable portion is a plunger plate.

Embodiment 14

The moving core device as recited in embodiment 13, wherein the slide includes a sloped surface arranged for sliding contact with the plunger plate.

Embodiment 15

The moving core device as recited in embodiment 13, further comprising an additional slide disposed opposite the slide and configured and arranged such that movement of the plunger plate in a first direction causes the slides to move away from each other, and a depth of the undercut is defined by a distance between a first portion of the slide and a first portion of the additional slide when the two slides are at a maximum distance apart from each other.

Embodiment 16

An apparatus, comprising: a mold; and a means for creating an integral undercut in a blow-molded structure, the means configured to be temporarily disposed within the mold.

Embodiment 17

A method, comprising: positioning, in a mold, a means for creating an integral undercut in a molded structure; and forming a unitary single-piece structure of hollow plastic by introducing plastic into the mold, wherein formation of the unitary single-piece structure includes the formation, by the means, of an undercut that is an integral element of the unitary single-piece structure.

Embodiment 18

The method as recited in embodiment 17, wherein the unitary single-piece structure is a kayak or a paddleboard.

Embodiment 19

The method as recited in embodiment 15, further comprising forming a recess as an integral element of the unitary single-piece structure, wherein the recess is integral with the undercut.

Embodiment 20

The method as recited in embodiment 17, wherein the unitary single-piece structure of hollow plastic is formed by blow-molding.

Embodiment 21

The method as recited in embodiment 17, wherein the unitary single-piece structure of hollow plastic is formed by one of roto-molding, thermoforming, vacuum molding, twin sheet molding, or drape molding.

Embodiment 22

The method as recited in embodiment 17, wherein the means for creating an integral undercut in a molded structure comprises a moving core device.

Embodiment 23

The method as recited in embodiment 17, further comprising removing the means from the mold after the unitary single-piece structure and integral undercut have been formed.

Embodiment 24

A watercraft, comprising: a hull in the form of a molded structure that is substantially hollow, and made of plastic; and a grip including one or more undercuts that are integral with the hull.

Embodiment 25

The watercraft as recited in embodiment 24, wherein the watercraft is either a kayak or a paddleboard.

Embodiment 26

The watercraft as recited in embodiment 6, wherein the grip comprises a recess that is integral with the hull, and also comprises first and second integral undercuts disposed proximate respective opposing sides of the recess.

Embodiment 27

The watercraft as recited in embodiment 24, wherein one of the integral undercuts is sized and configured to accommodate portions of one or more fingers of the hand of a user.

Embodiment 28

The watercraft as recited in embodiment 26, wherein one undercut extends around less than an entire perimeter of the recess.

Embodiment 29

The watercraft as recited in embodiment 26, wherein the grip is positioned within an outer envelope defined by a perimeter P of a cross-section of the watercraft.

Embodiment 30

The watercraft as recited in embodiment 24, wherein the molded structure is formed by one of: roto-molding, thermoforming, vacuum molding, twin sheet molding, or drape molding.

Embodiment 31

A method, comprising: positioning, in a mold, a means for creating an integral undercut in a molded structure; and forming a structure of hollow plastic by introducing plastic into the mold, wherein formation of the structure includes the formation, by the means, of an undercut that is an integral element of the structure.

Embodiment 32

The method as recited in embodiment 31, wherein the molded structure is formed by one of: roto-molding, thermoforming, vacuum molding, twin sheet molding, or drape molding.

Although this disclosure has been described in terms of certain embodiments, other embodiments apparent to those of ordinary skill in the art are also within the scope of this disclosure. Accordingly, the scope of the disclosure is intended to be defined only by the claims which follow.

What is claimed is:
1. A moving core device, comprising:
a plunger comprising an angled surface;

a first complementary structure connected to the plunger and extending through the angled surface of the plunger; and a slide including an angled surface configured and arranged for sliding contact with the angled surface of the plunger, and the slide defining a second complementary structure with which the first complementary structure is slidingly engaged, and the slide is disposed in an operational relationship with respect to the plunger such that a movement of one of the slide and the plunger is associated with a corresponding movement of the other of the slide and the plunger, the slide being configured to assume an extended position and a retracted position, and an outer portion of the slide having a configuration which corresponds to a configuration of part of a corresponding undercut.

2. The moving core device as recited in claim 1, wherein a movement of the plunger along a first axis causes a movement of the slide along a second axis that is not parallel to the first axis.

3. The moving core device as recited in claim 1, wherein the first complementary structure comprises a tab, and the second complementary structure comprises a channel.

4. The moving core device as recited in claim 1, further comprising an additional slide disposed opposite the slide and engaged with the plunger, and the slide and the additional slide are configured and arranged such that movement of the plunger in a first direction causes the slides to move away from each other, and a depth of the undercut is defined by a distance between a first portion of the slide and a first portion of the additional slide when the two slides are at a maximum distance apart from each other.

5. The moving core device as recited in claim 3, wherein part of the channel is recessed below the angled surface of the slide.

6. The moving core device as recited in claim 3, wherein the tab has a T-shaped cross-section, and a portion of the channel has a T-shaped cross section.

7. The moving core device as recited in claim 1, wherein the plunger comprises another angled surface located on the same side of the plunger as, and disposed below, the first angled surface of the plunger, and the another angled surface of the plunger is configured and arranged for sliding contact with another angled surface of the slide located on the same side of the slide as, and disposed below, the angled surface of the slide.

8. The moving core device as recited in claim 1, further comprising a track with which the slide is engaged.

9. The moving core device as recited in claim 8, wherein the track constrains the slide to lateral motion.

10. The moving core device as recited in claim 8, wherein the track extends through the angled surface of the slide.

11. A moving core device, comprising:
a plunger, comprising:
an upper angled surface located on a first side of the plunger; and
a lower angled surface located on a first side of the plunger below the upper angled surface of the plunger; and
a slide comprising:
an upper angled surface located on a first side of the slide and configured and arranged for sliding contact with the upper angled surface of the plunger; and
a lower angled surface located on the first side of the slide below the upper angled surface of the slide, and the lower angled surface of the slide is configured and arranged for sliding contact with the lower angled surface of the plunger, and
the plunger and the slide are engaged with each other such that a vertical motion of the plunger corresponds to a lateral motion of the slide.

12. The moving core device as recited in claim 11, wherein the upper angled surface of the plunger and the lower angled surface of the plunger are separate from each other.

13. The moving core device as recited in claim 11, wherein the upper angled surface of the slide and the lower angled surface of the slide are separate from each other.

14. The moving core device as recited in claim 11, wherein the slide is configured to assume an extended position and a retracted position in response to respective movements of the plunger.

15. The moving core device as recited in claim 11, wherein the slide comprises a protrusion that extends along a majority of a length of the slide.

16. The moving core device as recited in claim 11, wherein along an imaginary Z-axis, a length of the slide is about the same as a length of the plunger.

17. The moving core device as recited in claim 11, further comprising one or more tracks with which the slide is engaged.

18. The moving core device as recited in claim 11, wherein:
the upper angled surface of the plunger comprises multiple separate portions and/or the lower angled surface of the plunger comprises multiple portions; and
the upper angled surface of the slide comprises multiple separate portions.

19. The moving core device as recited in claim 11, further comprising another slide engaged with the plunger.

20. The moving core device as recited in claim 11, further comprising:
a first complementary structure connected to the plunger; and
second complementary structure defined by the slide and engaged with the first complementary structure.

* * * * *